(12) United States Patent
Ruzicka et al.

(10) Patent No.: US 7,121,536 B2
(45) Date of Patent: Oct. 17, 2006

(54) WAVE GENERATOR WITH OXYGEN INJECTION FOR TREATMENT OF A BODY OF FLUID

(75) Inventors: Wayne E. Ruzicka, Bismarck, ND (US); William J. Haldane, Bozeman, MT (US); Warren C. Enyart, Bismarck, ND (US); Dixon C. Hartsoch, Tioga, ND (US)

(73) Assignee: Pond Doctor, Inc., Bismarck, ND (US)

( * ) Notice: Subject to any disclaimer, the term of this patent is extended or adjusted under 35 U.S.C. 154(b) by 76 days.

(21) Appl. No.: 10/337,475

(22) Filed: Jan. 7, 2003

(65) Prior Publication Data

US 2003/0127754 A1 Jul. 10, 2003

Related U.S. Application Data

(60) Provisional application No. 60/431,137, filed on Dec. 5, 2002, provisional application No. 60/347,202, filed on Jan. 9, 2002.

(51) Int. Cl.
*B01F 3/04* (2006.01)
(52) U.S. Cl. .......................... 261/91; 261/93; 261/120; 261/122.1; 210/221.2; 210/242.2
(58) Field of Classification Search ............... 261/36.1, 261/37, 91, 93, 120, 122.1, DIG. 71; 210/221.2, 210/242.2
See application file for complete search history.

(56) References Cited

U.S. PATENT DOCUMENTS

| | | | |
|---|---|---|---|
| 3,204,768 A | 9/1965 | Daniel ........................ 210/197 |
| 3,735,926 A * | 5/1973 | Ravitts ........................ 239/16 |
| 3,771,724 A * | 11/1973 | Rose et al. ................. 239/221 |
| 3,785,558 A * | 1/1974 | Albritton et al. ............. 239/16 |
| 3,794,303 A | 2/1974 | Hirshon ........................ 261/61 |
| 3,856,272 A | 12/1974 | Ravitts ........................ 259/95 |
| 3,865,721 A * | 2/1975 | Kaelin ........................ 210/627 |
| 3,998,389 A * | 12/1976 | Rose et al. ............ 239/214.21 |
| 4,030,859 A | 6/1977 | Henegar ....................... 417/61 |
| 4,179,243 A | 12/1979 | Alde ........................... 417/61 |

(Continued)

FOREIGN PATENT DOCUMENTS

CA 1262052 10/1989

(Continued)

OTHER PUBLICATIONS

Aeromix Systems, Incorporated, Minneapolis, MN; *Hurricane Submersible Aspirating Aerator/Mixer* Brochure; Sep. 1997.

(Continued)

*Primary Examiner*—Scott Bushey
(74) *Attorney, Agent, or Firm*—Marsh Fischmann & Breyfogle LLP

(57) ABSTRACT

One embodiment of an aerator is disclosed that has a hollow intake housing with a horizontally disposed lip on a lower portion thereof. This intake housing converges a flow of bubbles into a draft tube. These bubbles are injected into a fluid in which the aerator is installed at a location that is directly under the intake housing. A fluid flow is also drawn into this draft tube through the intake housing. Fluid exiting the opposite end of the draft tube is directed into a hollow discharge housing having a divergent inner surface. A wave generator (e.g., a rotating impeller) is mounted within the hollow interior of the discharge housing. The upper end of this discharge housing also includes a horizontally disposed lip to direct a flow out of the aerator at least generally parallel with an upper surface of the fluid.

40 Claims, 14 Drawing Sheets

U.S. PATENT DOCUMENTS

| | | | | |
|---|---|---|---|---|
| 4,242,199 | A | * | 12/1980 | Kelley .......................... 210/758 |
| 4,318,871 | A | * | 3/1982 | Mentz .......................... 261/120 |
| 4,465,645 | A | * | 8/1984 | Kaelin .......................... 261/87 |
| 4,540,528 | A | * | 9/1985 | Haegeman ................... 261/91 |
| 4,647,374 | A | | 3/1987 | Ziaylek et al. ............ 210/242.1 |
| 4,657,675 | A | | 4/1987 | Zan ............................ 210/170 |
| 4,690,756 | A | * | 9/1987 | Van Ry .................... 210/221.2 |
| 4,906,359 | A | | 3/1990 | Cox ............................ 210/170 |
| 5,085,809 | A | * | 2/1992 | Stirling ....................... 261/77 |
| 5,707,562 | A | * | 1/1998 | Karliner ...................... 261/91 |
| 6,158,722 | A | | 12/2000 | Gigas .......................... 261/84 |
| 6,227,525 | B1 | | 5/2001 | Haegeman ................... 261/84 |
| 6,394,423 | B1 | | 5/2002 | Vento .......................... 261/29 |
| 6,432,302 | B1 | | 8/2002 | Obritsch et al. ............ 210/170 |
| 6,439,853 | B1 | | 8/2002 | Tormaschy et al. ........... 417/53 |
| 6,461,500 | B1 | | 10/2002 | Hoage et al. ............... 210/150 |

FOREIGN PATENT DOCUMENTS

| | | |
|---|---|---|
| JP | 11047794 | 2/1999 |
| WO | WO 00/71475 A1 | 11/2000 |

OTHER PUBLICATIONS

Ecoessence, Incorporated; *Ecoeddy Circulators-Aerators for Waste Lagoons and Fish Ponds* Brochure; Sep. 1997.

Otterbine/Barebo, Inc., Emmaus, PA; *Balancing Waterways* Brochure; Nov. 1997.

Las International, Bismarck, ND; *Accel-O-Fac the Zero-to-Law Energy "Accelerated Facultative" Process* Brochure; 1997.

Environmental Equipment Engineering, Inc., Mechanicsville, VA; *Energy Efficient Floating Aerators* Brochure; 1989.

\* cited by examiner

FIG 4
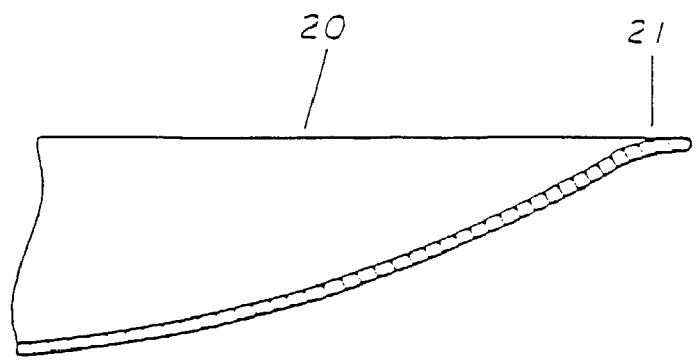
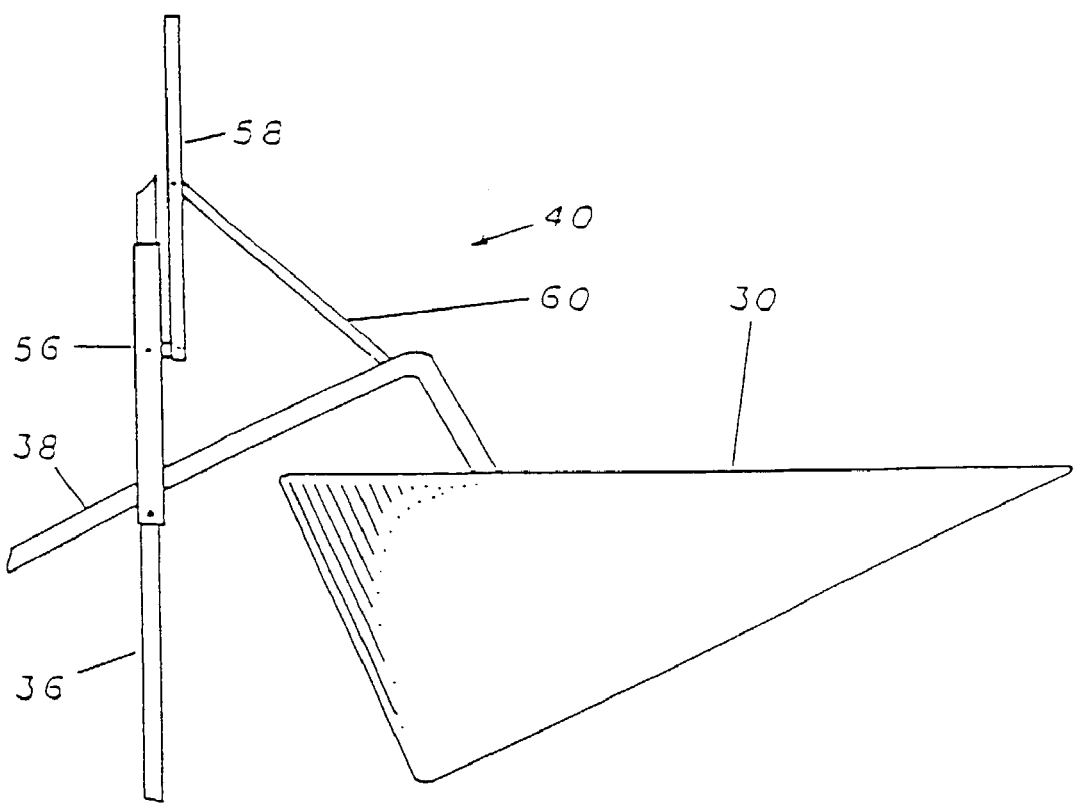
FIG 5

FIG 17
FIG 18
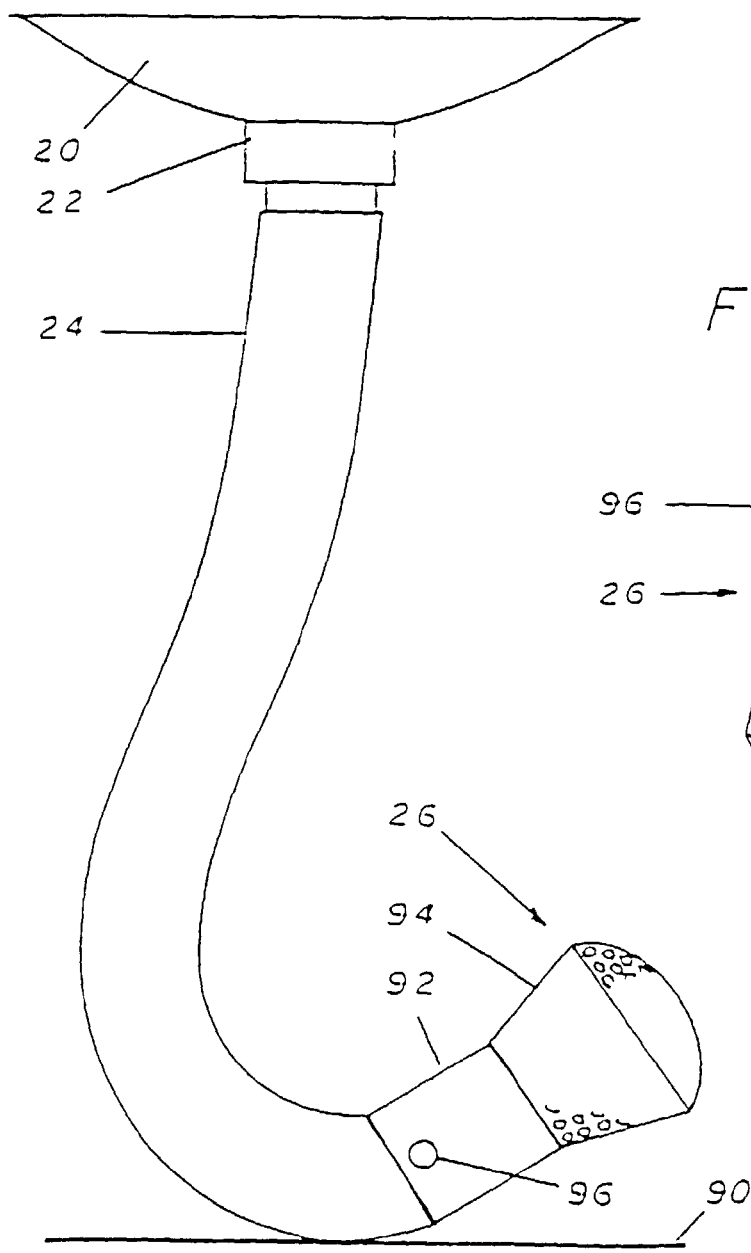
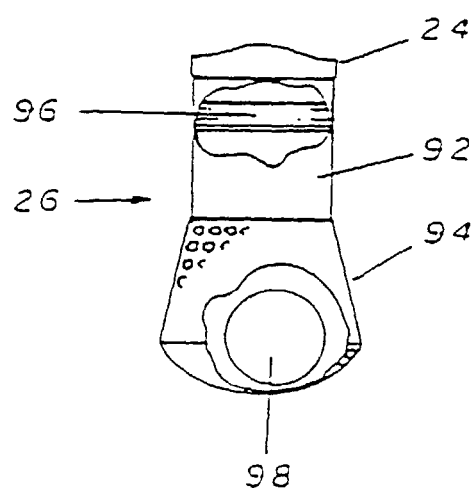

WAVE GENERATOR WITH OXYGEN INJECTION FOR TREATMENT OF A BODY OF FLUID

CROSS REFERENCE TO RELATED APPLICATIONS

This patent application claims priority under 35 U.S.C. §119(e) to U.S. Provisional Patent Application Ser. No. 60/431,137, entitled "WAVE GENERATOR WITH OXYGEN INJECTION FOR TREATMENT OF A BODY OF FLUID", and filed Dec. 5, 2002, and further claims priority under 35 U.S.C. §119(e) to U.S. Provisional Patent Application Ser. No. 60/347,202, entitled "FLOATING WATER CIRCULATION APPARATUS", and filed on Jan. 9, 2002. The entire disclosure of both of the above-noted provisional patent applications are incorporated by reference herein.

FIELD OF THE INVENTION

The present invention generally relates to aerating a body of fluid, such as a waste water pond or the like, and, more particularly, to aerating such a body of fluid utilizing the injection of an oxygen-containing gas into a submerged wave generator that circulates fluid within the fluid body.

BACKGROUND OF THE INVENTION

In order for many bodies of water to develop and maintain a healthy eco-system, a non-specific amount of circulation is typically required. This is because many of the bacteria that are necessary for breaking down or digesting nutrients are immobile, and therefore, need to be placed in intimate contact with nutrients, necessary to thrive, by circulation of the water. Furthermore, in the majority of applications, bacteria also need oxygen to survive and flourish. The most readily available source of oxygen is from the atmosphere.

Oxygen can enter the water through contact with the atmosphere which may be accelerated through mixing, as happens in nature through waterfalls, streams, rain, and wind. It has been found that adding artificial aeration, to assist nature, to natural and man made ponds and lagoons can greatly increase the health of the ponds. This may be especially useful in sewage lagoons and the like as the decay process could be accelerated and unpleasant smells reduced.

In order to combine the movement of liquid and supplying of the oxygen, past prior art has typically used one of three methods: (1) a surface splashing action (2) an aspirator/boat prop effect which draws atmospheric air in and then forces air bubbles out or (3) compressing atmospheric air and then releasing it at the bottom of the body of liquid. In each of these actions two things are readily apparent (A) high energy input with corresponding high maintenance needs and (B) the action created is always turbulent.

The use of pond aerators on floating bases has been well established such as those shown by U.S. Pat. No. 4,179,243 granted to Aide and U.S. Pat. No. 4,030,859 granted to Henager. In these patents, devices are typically supplied with a draft tube placed just below the surface of the water. This tube houses a propeller or impeller that is connected to a drive means. A draft line is placed at a predetermined depth and connected to the draft tube. Thus, as the drive means turns, the impeller or propeller draws water from a certain depth and defuses it at the water surface. This process circulates and turns the water in the pond. As power to the pump can be a significant issue in remote areas, such as the middle of a pond or lake, the efficiency of the whole unit is crucial to its success. This has required that alternative means of driving the pump on pond mixers would be desirable. One solution has been to use wind power, however wind powered pumps are large in size, expensive, cumbersome, and create a need for complex and expensive anchoring systems.

A floating water circulation apparatus is described in International Publication No. WO 00/71475 A1, that was published on Nov. 30, 2000, and that is entitled "Water Circulation Apparatus System and Method" (hereafter "System"). The System has some limitations in certain environments that are reduced or removed with the present invention. In order to understand the significance of the present invention, the principle functions of the System warrant a brief review.

The System generally relates to an aeration system for lakes and ponds and is specifically designed as a floating device which draws oxygen-depleted water from the depths of the ponds to the surface where it is set in motion on the surface and where the thin surface layer of water will absorb oxygen from the air (reaeration).

The System is essentially a solar powered floating hydraulic pump. One unique aspect of the System is in the manner in which the discharge is distributed by a distribution dish. The head required, and therefore the horsepower, for the effective distribution is less than one inch. The combined effect of the conical shape of the distribution dish, the orientation and the width of the lip on the distribution dish, and the position and operating speed of an impeller that is also utilized by the System, produce near-laminar flow on the surface. In this mode, the discharged water flows radially outward in thin successive sheets over the surface of the pond or lake in near frictionless fashion (laminar flow) to the pond embankment. When this surface layer is initially depleted of oxygen, it will, as it progresses across the pond, become saturated with pure oxygen by exposure to the atmosphere.

At the embankment, the laminar flow on the surface establishes a shallow head, causing the water to descend to the depth at which an intake screen of the System is set. At this depth the water migrates radially inward to the intake screen in a horizontal zone which is somewhat wider than the vertical distance across the intake screen (18 inches) that is attached to an intake draft tube of the System. The intake draft tube is flexible and while the intake screen may be raised or lowered, the intake draft tube will often block or inhibit omnidirectional flows to the intake screen.

The volume of liquid pumped directly by the solar powered impeller utilized by the System may be characterized as a Direct Mechanical Displacement (DMD), and in relation to the System is defined as the volume of water that is drawn into its intake draft tube and discharged over the edge of its distribution dish over a given amount of time. The DMD is measured in gallons per minute. In the case of the System, the value of the DMD is a function of the diameter and total internal friction of its intake tube, the diameter and pitch of its impeller, the slope of the sides of its conical shaped distribution dish, the depth of the impeller beneath the surface, the depth of the edge of its distribution dish with respect to the surface of the pond, and the shaft-horsepower (and resultant revolutions per minute) applied to its impeller.

The DMD produced by the System induces additional currents in the pond that are directly dependent upon the DMD. In its progression across the pond, the thin surface layer, with its higher velocity relative to the water beneath it and diverging streamlines (relative direction of flows), create a pressure differential which results in upward currents in the water beneath the surface that are referred to in International Publication No. WO 00/71475 A1 as "induced flows". Eventually, through the combination of DMD and induced flows, the entire pond volume between the depth of the lowest point of openings in the intake screen and the pond surface becomes mixed. Provided oxygen-depleted water continues to enter the intake draft tube, the pond in which the System is operating will absorb greater quantities of oxygen from the air than would otherwise be provided by unassisted natural forces.

Once absorbed in the surface layer, which happens relatively quickly (30–40 seconds), the oxygen begins to diffuse downward. Compared to the rate at which oxygen from the atmosphere is transferred into the surface layer, the speed of diffusion is relatively slow and is dependent upon the gradient of oxygen depleted water beneath the surface and upon mixing action. The rate of diffusion is therefore the controlling function. The volume of oxygen absorbed is directly proportional to the size of the surface area of the oxygen-depleted water layer. The size of the surface layer increases with the square of the distance the laminar flow has proceeded (at the rate of about 1'/sec.) from the distribution dish. The volume of reaeration therefore depends upon time and distance from the distribution dish. Likewise, the rate of diffusion, which depends upon the supply, in this case, reaeration, and the demand (relative depletion) in the water below, the total oxygen transfer via reaeration effects by the System require some distance to become appreciable. Experience with the System has shown that the combined effects of reaeration and diffusion is not fully optimized at distances of less than 100 feet from the distribution dish, when the impeller is consistently rotating within the range of 75–115 RPM.

Because the supply of oxygen by reaeration is a function of the degree of surface area, oxygen-depletion, rate of mixing, as well as atmospheric conditions, the efficiency of the System is dependent upon the environment in which it may be located. Its beneficial effects are severely limited when operating in a pond with a small surface area (less than 1 acre) and when the rate of oxygen uptake by biological and chemical reactions in the pond exceed the rate of supply through natural reaeration. Also, under these conditions, the distribution dish of the System eventually fouls due to plant growth, reducing its efficiency.

BRIEF SUMMARY OF THE INVENTION

A first aspect of the present invention is embodied by an aerator having an intake housing, a discharge housing fluidly interconnected with the intake housing, at least one gas injector, and a wave generator. Generally, the gas injector(s) may be utilized to direct a flow of an appropriate gas (e.g., air, oxygen-containing gas) into a fluid (e.g., any body of an appropriate fluid, such as a waste water pond or the like) in which the aerator is installed. Bubbles from this injection are introduced into the submerged intake housing and are converged by this intake housing for transport ultimately to the discharge housing. The wave generator produces one or more waves (e.g., by a pulsing or pulsing-like action) in the fluid as it passes through and then exits the discharge housing.

The intake housing of the first aspect has first and second openings that are vertically spaced. When installed in a fluid, the first opening will be disposed further from the surface of the fluid than the second opening. An annular intake housing inner surface extends between these first and second openings. At least a portion of the intake housing inner surface converges in the direction of the second opening. The discharge housing similarly has third and fourth openings that are similarly vertically spaced. When installed in a fluid, the third opening will be disposed further from the surface of the fluid than the fourth opening. An annular discharge housing inner surface extends between these third and fourth openings. At least a portion of the discharge housing inner surface diverges in the direction of the fourth opening. The second opening of the intake housing (the "uppermost" of its pair of openings) and the third opening of the discharge housing (the "lowermost" of its pair of openings) are in fluid communication (directly or indirectly). The gas injector(s) is disposed vertically under (e.g., vertically aligned with) the intake housing inner surface such that the intake housing provides the above-noted bubble flow converging function. The wave generator will induce a flow out of the fourth opening of the discharge housing in the form of one or more waves.

Various refinements exist of the features noted in relation to the first aspect of the present invention. Further features may also be incorporated in the first aspect of the present invention as well. These refinements and additional features may exist individually or in any combination. The aerator may be mounted on a frame of any appropriate configuration and may include one or more floats of any appropriate configuration so as to support the aerator in a desired manner when installed in the fluid. Although a float system is a preferred configuration, other ways for installing the aerator in the fluid may be utilized. Any appropriate power source may be used by the aerator and for any purpose (e.g., for operating the wave generator; for operating a supply source used by the gas injector(s)).

One way to characterize the intake housing associated with the first aspect is as a hollow intake manifold or the like for directing a fluid flow, as well as a flow of bubbles from the gas injector(s), toward its second opening in a manner so that at least a portion of the bubble flow is converged. Any appropriate configuration may be utilized for the intake housing inner surface to produce this convergent flow (e.g., a frustumly-shaped surface; a surface having a curvature in a single dimension or that utilizes a compound curvature). There is also no requirement that any convergent portion of the intake housing inner wall extend completely from the first opening all the way to the second opening. As an example and in one embodiment, the lower portion of the intake housing includes an annular and at least generally vertically disposed skirt or the like, the lower end of which defines the first opening. An upper portion of the intake housing may then include an annular wall that converges from the upper end of this skirt to the second opening associated with the intake housing.

The first and second openings utilized by the intake housing of the first aspect may be disposed on opposite ends of the intake housing. Other orientations may be possible. In one embodiment, the diameter of the first opening is larger than the diameter of the second opening to provide a desired flow rate through the aerator. There may be instances where such need not necessarily be the case. Also, consider the case where the bottom of the intake housing is closed to at least a degree by a bottom wall. This bottom wall could include one or more apertures to define the inlet flow to the intake housing, one or more apertures could be included on a sidewall of the intake housing (e.g., in the form of a horizontally-disposed slot and including a single, annular slot), or both. In this case, each gas injector would be preferably disposed within the hollow, now more "enclosed" interior of the intake housing. However, it is preferred for the lower end of the intake housing to remain open and to define the first opening, subject to the existence of an annular horizontal lip that extends radially outwardly therefrom as will now be described.

The intake housing associated with the first aspect may include an annular wall or lip that is at least substantially horizontally disposed (e.g., in at least substantially parallel relation with the upper surface of the fluid in which the aerator is installed and that extends radially outwardly from the first opening). This horizontal wall or lip may be at least generally coplanar with the first opening. Stated another way, the first opening and the annular horizontal wall or lip may be disposed on one end of the intake housing, with the horizontal wall or lip extending radially outwardly from the first opening. In one embodiment, the minimal horizontal extent of this annular wall is about 1.25 inches. Another embodiment has the horizontal extent of this annular wall at a minimum of about 1.5 inches to about 2 inches.

The vertical position of the above-noted annular wall or lip within the fluid may be vertically adjustable in any appropriate manner. For instance, a vertically oriented and interconnecting conduit or draft tube may be provided between the intake and discharge housings. This conduit may actually be defined by a pair of conduit sections. One of the conduit sections may be appropriately interconnected with the intake housing at its second opening, while the other of the conduit sections may be appropriately interconnected with the discharge housing at its third opening. This pair of conduit sections may interconnected so as to telescope and thereby allow for changing the vertical position of the above-noted horizontal, annular wall or lip of the intake housing.

Having the horizontally disposed annular wall or lip on the "lower end" of the intake housing associated with the first aspect provides a number of advantages. One is that the fluid flow into the intake housing is believed to be primarily horizontal (e.g., radially inwardly toward the aerator), which improves upon the fluid circulation in the fluid in which the aerator is installed, to in turn improve reaeration. Generally, fluid that is discharged from the discharge housing is believed to flow horizontally to the embankment, down the embankment, and then back to the aerator along a substantially horizontal path. Another advantage of the horizontal wall or lip on the lower end of the intake housing is that the volume of fluid drawn into the intake housing is believed to be more precisely controlled. It is believed that a layer of fluid of about a 6 inch thickness or vertical extent (a "draft zone") is drawn into the intake housing in the above-noted horizontal fashion due at least in part to including the horizontal wall or lip on the lower end of the intake housing. The thickness of the draft zone directly under the intake housing may of course be bulged downwardly to a degree. This principally horizontal draft zone, combined with the above-noted vertical adjustability feature, provides significant flexibility in the "treatment" of the fluid body by the aerator of the first aspect.

The elevation of the above-noted about 6 inch horizontal zone within the fluid also in effect defines a mixing zone. Generally, that volume of fluid located above this 6 inch horizontal draft zone is subject to mixing by the flow from the aerator to the embankment and the flow from the embankment back to the aerator. It should be appreciated that the mixing effects are enhanced as the radial distance from the aerator is reduced.

The discharge housing associated with the first aspect includes a surface that diverges in the direction of the fourth opening. Any appropriate configuration may be utilized for the discharge housing inner surface to provide this divergent surface (e.g., a frustumly-shaped surface; a surface having a curvature in a single dimension or that utilizes a compound curvature). There is also no requirement that any divergent portion of the discharge housing inner surface extend completely from the third opening all the way to the fourth opening. However, in one embodiment the discharge housing inner surface does indeed at least generally diverge over the entire distance from the third opening to the fourth opening.

Fluid is discharged out of the aerator through the discharge housing associated with the first aspect, including any entrained bubbles. This flow is preferably at least substantially laminar and is directed away from the discharge housing in a direction that is at least substantially parallel with the upper surface of the fluid in which the aerator is installed. In this regard, the discharge housing may also include an annular wall or lip that is at least generally horizontally disposed (e.g., in at least substantially parallel relation with the upper surface of the fluid in which the aerator is installed) and that extends radially outwardly from the fourth opening. This horizontal wall or lip may be at least generally coplanar with the fourth opening. Stated another way, the fourth opening and the annular horizontal wall or lip may be disposed on one end of the discharge housing, with the horizontal wall or lip extending radially outwardly from the fourth opening. In one embodiment, the minimal horizontal extent of this annular wall is about 1.25 inches. Another embodiment has the horizontal extent of this annular wall at a minimum of about 1.5 inches to about 2 inches. Disposing this annular wall or lip of the discharge housing in proximity to the surface of the fluid body, but at least slightly below, is desirable. In one embodiment, this annular wall or lip of the discharge housing is disposed about 0.75 inches below the surface of the fluid body when measured without flows through the discharge housing. Stated another way, there is about 0.75 inches of fluid above the annular wall or lip of the discharge housing in the noted embodiment. The depth at which the annular wall or lip of the discharge housing is disposed is controlled by the operator and is dependent upon the horsepower of the blower motor supplying air to the gas injectors and the desired wave amplitude. Depths of 0.5"–1.5" are reasonable ranges. Both the intake and discharge housings preferably include the above-described horizontally disposed annular wall or lip and are preferably of about the same outer diameter at their respective opposite ends. That is, in one embodiment, the outer diameter of the lowermost end of the intake housing is at least generally the same as the outer diameter of the uppermost end of the discharge housing when the aerator of the first aspect is installed in a fluid.

The third and fourth openings utilized by the discharge housing of the first aspect may be disposed on opposite ends of the discharge housing. Other orientations may be possible. In one embodiment, the diameter of the fourth opening is larger than the diameter of the third opening. There may be instances where such need not necessarily be the case. Also, consider the case where the top of the discharge housing is closed to at least a degree by an upper wall. The desired horizontal flow out of the discharge housing could be realized by an annular slot on the discharge housing. However, it is preferred for the upper end of the discharge housing to remain open, to define the fourth opening, and to have the above-noted annular horizontal wall or lip extending radially outwardly therefrom.

Each gas injector utilized by the aerator of the first aspect is preferably in the form of a diffuser, but may be of any appropriate configuration for injecting gas bubbles into the fluid body. Air may be utilized to create the bubbles or any other oxygen-containing gas. Any appropriate power source may be utilized to inject gas into the fluid. Sizing of the bubbles may be adapted for the particular application or the desired result(s). Smaller bubbles will typically be more preferred. Bubbles are preferably propelled into the fluid body at least substantially vertically upwardly toward the surface of the fluid in which the aerator is installed (i.e., not having any initial "horizontal" motion component). That is, the gas injector(s) "point straight up" toward the surface of the fluid body in one embodiment. This configuration allows the bubbles to "lift off", rather than sheer off, thereby minimizing coalescence and providing a more uniform and efficient supply of small bubbles.

Preferably at least a substantial portion, and more preferably all, of the bubbles are captured by the intake housing in the case of the first aspect. In this regard, in one embodiment each gas injector is disposed within a hollow interior of the intake housing. The locale at which bubbles are injected into the fluid body by the gas injector(s) also may be at least generally coplanar with the lowermost extreme of the intake housing, and possibly may be spaced a relatively small amount downwardly from a reference plane that contains a lowermost extreme of the intake housing. Each gas injector is preferably vertically aligned with a convergent portion of the intake housing inner surface and is sufficiently spaced therefrom. Bubbles injected into the fluid will then have to travel vertically through the fluid at least a certain distance before engaging any such convergent portion to induce a horizontal motion component on the bubbles.

Injecting oxygen-containing bubbles into the fluid has a number of desirable effects in the case of the first aspect. One is of course for aeration. Another is that the manner in which the bubbles travel through the aerator actually increases the fluid flow from the discharge housing. Injecting bubbles into the intake housing produces fluid flows out of the discharge housing. In one embodiment, these flows are on the order of at least about 800–900 gallons per minute without using any other "pumping action" by the aerator (e.g., without operating the wave generator, which in one embodiment may be an impeller as will be discussed in more detail below). Contrast this with the above-described System where fluid flows out of its distribution dish were more on the order of about 250 gallons per minute and that were generated solely by the rotation of its impeller.

Waves result from operation of the wave generator utilized by the aerator of the first aspect. In one embodiment the wave generator is in the form of an impeller. Any appropriate apparatus may be utilized by the first aspect to generate waves that emanate from the discharge housing. However, as noted above an at least substantially laminar flow out of the aerator is preferred. Preferred waves are those that are directed at least generally radially outwardly from the discharge housing. More preferred waveforms include waves that spiral radially outwardly from the discharge housing and which may be realized by the configuration of a rotating impeller in the form of the wave generator. In one embodiment where the wave generator is in the form of an impeller, this impeller may be located within the hollow interior of the discharge housing in relatively close proximity to the third opening or the upper end of the vertically disposed conduit or draft tube that may be used to interconnect the intake housing and the discharge housing as noted above. The outer diameter of this impeller may be slightly larger than the inner diameter of this conduit. Although the function of the impeller is to generate waves, it may also tend to increase the residence time of the bubbles within the fluid, and thereby improve upon the oxygen transfer.

A second aspect of the present invention is embodied by an aerator having an intake housing, a discharge housing fluidly interconnected with the intake housing, and a wave generator. The intake housing of the second aspect has first and second openings that are vertically spaced. When installed in a fluid, the first opening will be disposed further from the surface of the fluid than the second opening. The intake housing includes an annular horizontal lip or wall that extends radially outwardly from the first opening. An annular intake housing inner surface extends between these first and second openings. At least a portion of the intake housing inner surface preferably converges in the direction of the second opening.

The discharge housing utilized by the second aspect has third and fourth openings that are also vertically spaced. When installed in a fluid, the third opening will be disposed further from the surface of the fluid than the fourth opening. An annular discharge housing inner surface extends between these third and fourth openings. At least a portion of the discharge housing inner surface diverges in the direction of the fourth opening. The second opening of the intake housing (the "uppermost" of its pair of openings) and the third opening of the discharge housing (the "lowermost" of its pair of openings) are in fluid communication (directly or indirectly). The wave generator may induce a flow out of the fourth opening of the discharge housing in the form of one or more waves.

Various refinements exist of the features noted in relation to the second aspect of the present invention. Further features may also be incorporated in the second aspect of the present invention as well. These refinements and additional features may exist individually or in any combination. The aerator may be mounted on a frame of any appropriate configuration and may include one or more floats of any appropriate configuration so as to support the aerator in a desired manner when installed in the fluid. Although a float system is a preferred configuration, other ways for installing the aerator in the fluid may be utilized. Any appropriate power source may be used by the aerator and for any purpose (e.g., for operating the wave generator; for operating a supply source used by a gas injector(s) that may be utilized by the second aspect and as will be discussed in more detail below).

One way to characterize the intake housing associated with the second aspect is as a hollow intake manifold or the like for directing a fluid flow, as well as a flow of bubbles from a gas injector(s) that may be utilized by the second aspect and as will be discussed in more detail below, toward its second opening in a manner so that at least a portion of the flow is converged. Any appropriate configuration may be utilized for the intake housing inner surface to produce this convergent flow (e.g., a frustumly-shaped surface; a surface having a curvature in a single dimension or that utilizes a compound curvature). There is also no requirement that any convergent portion of the intake housing inner wall extend completely from the first opening all the way to the second opening. As an example and in one embodiment, the lower portion of the intake housing includes an annular and at least generally vertically disposed skirt or the like, the lower end of which defines the first opening. An upper portion of the intake housing may then include an annular wall that converges from the upper end of this skirt to the second opening associated with the intake housing.

The first and second openings utilized by the intake housing of the second aspect may be disposed on opposite ends of the intake housing. Other orientations may be possible. In one embodiment, the diameter of the first opening is larger than the diameter of the second opening to provide a desired flow rate through the aerator. There may be instances where such need not necessarily be the case. Also, consider the case where the bottom of the intake housing is closed to at least a degree by a bottom wall. This bottom wall could include one or more apertures to define the inlet flow to the intake housing, one or more apertures could be included on a sidewall of the intake housing (e.g., in the form of a horizontally-disposed slot and including a single, annular slot), or both. In this case, each gas injector that may be utilized by the second aspect and as will be discussed in more detail below, would preferably be disposed within the hollow, now more "enclosed" interior of the intake housing. However, it is preferred for the lower end of the intake housing to remain open and to define the first opening, subject to the existence of the annular horizontal lip that extends radially outwardly therefrom as will now be described in more detail.

The intake housing associated with the second aspect again includes an annular wall or lip that is at least substantially horizontally disposed (e.g., in at least substantially parallel relation with the upper surface of the fluid in which the aerator is installed and that extends radially outwardly from the first opening). This horizontal wall or lip may be at least generally coplanar with the first opening. Stated another way, the first opening and the annular horizontal wall or lip may be disposed on one end of the intake housing, with the horizontal wall or lip extending radially outwardly from the first opening. In one embodiment, the minimal horizontal extent of this annular wall is about 1.25 inches. Another embodiment has the horizontal extent of this annular wall at a minimum of about 1.5 inches to about 2 inches.

The vertical position of the above-noted annular wall or lip within the fluid may be vertically adjustable in any appropriate manner. For instance, a vertically oriented and interconnecting conduit or draft tube may be provided between the intake and discharge housings. This conduit may actually be defined by a pair of conduit sections. One of the conduit sections may be appropriately interconnected with the intake housing at its second opening, while the other of the conduit sections may be appropriately interconnected with the discharge housing at its third opening. This pair of conduit sections may interconnected so as to telescope and thereby allow for changing the vertical position of the above-noted horizontal, annular wall or lip of the intake housing.

Having the horizontally disposed annular wall or lip on the "lower end" of the intake housing associated with the second aspect provides a number of advantages. One is that the fluid flow into the intake housing is believed to be primarily horizontal (e.g., radially inwardly toward the aerator), which improves upon the fluid circulation in the fluid in which the aerator is installed, to in turn improve aeration. Generally, fluid that flows from the discharge housing is believed to flow horizontally to the embankment, down the embankment, and then back to the aerator along a substantially horizontal path. Another advantage of the horizontal wall or lip on the lower end of the intake housing is that the volume of fluid drawn into the intake housing is believed to be more precisely controlled. It is believed that a layer of fluid of about a 6 inch thickness or vertical extent (a "draft zone") is drawn into the intake housing in the above-noted horizontal fashion due at least in part to including the horizontal wall or lip on the lower end of the intake housing. The thickness of the draft zone directly under the intake housing may of course be bulged downwardly to a degree. This principally horizontal draft zone, combined with the above-noted vertical adjustability feature, provides significant flexibility in the "treatment" of the fluid body by the aerator of the second aspect.

The elevation of the above-noted about 6 inch horizontal zone within the fluid also in effect defines a mixing zone. Generally, that volume of fluid located above this 6 inch horizontal draft zone is subject to mixing by the flow from the aerator to the embankment and the flow from the embankment back to the aerator. It should be appreciated that the mixing effects are enhanced as the radial distance from the aerator is reduced.

The discharge housing associated with the second aspect again includes a surface that diverges in the direction of the fourth opening. Any appropriate configuration may be utilized for the discharge housing inner surface to provide this divergent surface (e.g., a frustumly-shaped surface; a surface having a curvature in a single dimension or that utilizes a compound curvature). There is also no requirement that any divergent portion of the discharge housing inner surface extend completely from the third opening all the way to the fourth opening. However, in one embodiment the discharge housing inner surface does indeed at least generally diverge over the entire distance from the third opening to the fourth opening.

Fluid is discharged out of the aerator through the discharge housing associated with the second aspect, including any entrained bubbles. This flow is preferably at least substantially laminar and is directed away from the discharge housing in a direction that is at least substantially parallel with the upper surface of the fluid in which the aerator is installed. In this regard, the discharge housing may also include an annular wall or lip that is at least generally horizontally disposed (e.g., in at least substantially parallel relation with the upper surface of the fluid in which the aerator is installed) and that extends radially outwardly from the fourth opening. This horizontal wall or lip may be at least generally coplanar with the fourth opening. Stated another way, the fourth opening and the annular horizontal wall or lip may be disposed on one end of the discharge housing, with the horizontal wall or lip extending radially outwardly from the fourth opening. In one embodiment, the minimal horizontal extent of this annular wall is about 1.25 inches. Another embodiment has the horizontal extent of this annular wall at a minimum of about 1.5 inches to about 2 inches. Disposing this annular wall or lip of the discharge housing in proximity to the surface of the fluid body, but at least slightly below, is desirable. In one embodiment, this annular wall or lip of the discharge housing is disposed about 0.75 inches below the surface of the fluid body when measured without flows through the discharge housing. Stated another way, there is about 0.75 inches of fluid above the annular wall or lip of the discharge housing in the noted embodiment. The depth at which the annular wall or lip of the discharge housing is disposed is controlled by the operator and is dependent upon the horsepower of the blower motor supplying air to the gas injectors and the desired wave amplitude. Depths of 0.5"–1.5" are reasonable ranges. Both the intake and discharge housings preferably include the above-described horizontally disposed annular wall or lip and are preferably of about the same outer diameter at their respective opposite ends. That is, in one embodiment, the outer diameter of the lowermost end of the intake housing is at least generally the same as the outer diameter of the uppermost end of the discharge housing when the aerator of the second aspect is installed in a fluid.

The third and fourth openings utilized by the discharge housing of the second aspect may be disposed on opposite ends of the discharge housing. Other orientations may be possible. In one embodiment, the diameter of the fourth opening is larger than the diameter of the third opening. There may be instances where such need not necessarily be the case. Also, consider the case where the top of the discharge housing is closed to at least a degree by an upper wall. The desired horizontal flow out of the discharge housing could be realized by an annular slot on the discharge housing. However, it is preferred for the upper end of the discharge housing to remain open, to define the fourth opening, and to have the above-noted annular horizontal wall or lip extending radially outwardly therefrom.

The aerator of the second aspect may also include at least one gas injector(s) to direct a flow of an appropriate gas (e.g., air, oxygen-containing gas) into the fluid in which the aerator is installed. Bubbles from this injection are introduced into the submerged intake housing and are converged by this intake housing for transport through the conduit. Each gas injector may be disposed vertically under the intake housing inner surface such that the intake housing provides the above-noted bubble flow converging function.

Each gas injector utilized by the aerator of the second aspect is preferably in the form of a diffuser, but may be of any appropriate configuration for injecting gas into the fluid body. Air may be utilized to create the bubbles or any other oxygen-containing gas. Any appropriate power source may be utilized to inject gas into the fluid. Sizing of the bubbles may be adapted for the particular application or the desired result(s). Smaller bubbles will typically be more preferred. Bubbles are preferably propelled into the fluid body at least substantially vertically upwardly toward the surface of the fluid in which the aerator is installed (i.e., not having any initial "horizontal" motion component). That is, the gas injector(s) "point straight up" toward the surface of the fluid body in one embodiment. This configuration allows the bubbles to "lift off", rather than sheer off, thereby minimizing coalescence and providing a more uniform and efficient supply of small bubbles.

Preferably at least a substantial portion, and more preferably all, of the bubbles are captured by the intake housing in the case of the second aspect. In this regard, in one embodiment each gas injector is disposed within a hollow interior of the intake housing. The locale at which bubbles are injected into the fluid body by the gas injector(s) also may be at least generally coplanar with the lowermost extreme of the intake housing, and possibly may be spaced a relatively small amount downwardly from a reference plane that contains a lowermost extreme of the intake housing. Each gas injector is preferably vertically aligned with a convergent portion of the intake housing inner surface and is sufficiently spaced therefrom. Bubbles injected into the fluid will then have to travel vertically through the fluid at least a certain distance before engaging any such convergent portion to induce a horizontal motion component on the bubbles.

Injecting oxygen-containing bubbles into the fluid has a number of desirable effects in the case of the second aspect. One is of course for aeration. Another is that the manner in which the bubbles travel through the aerator actually increases the fluid flows from the discharge housing. Injecting bubbles into the intake housing produces fluid flows out of the discharge housing. In one embodiment, these flows are on the order of at least about 800–900 gallons per minute without using any other "pumping action" by the aerator (e.g., without operating the wave generator, which in one embodiment may be an impeller as will be discussed in more detail below). Contrast this with the above-described System where fluid flows out of its distribution dish were more on the order of about 250 gallons per minute and that were generated solely by the rotation of its impeller.

Waves result from operation of the wave generator utilized by the aerator of the second aspect. In one embodiment the wave generator is in the form of an impeller. Any appropriate apparatus may be utilized by the second aspect to generate waves that emanate from the discharge housing. However, as noted above an at least substantially laminar flow out of the aerator is preferred. Preferred waves are those that are directed at least generally radially outwardly from the discharge housing. More preferred waveforms include waves that spiral radially outwardly from the discharge housing and which may be realized by the configuration of a rotating impeller in the form of the wave generator. In one embodiment where the wave generator is in the form of an impeller, this impeller may be located within the hollow interior of the discharge housing in relatively close proximity to the third opening or the upper end of the vertically disposed conduit or draft tube that may be used to interconnect the intake housing and the discharge housing as noted above. The outer diameter of this impeller may be slightly larger than the inner diameter of this conduit. Although the function of the impeller is to generate waves, it may also tend to increase the residence time of the bubbles within the fluid, and thereby improve upon the oxygen transfer.

A third aspect of the present invention is embodied by a method for aerating a fluid body. A flow of a plurality of bubbles are generated in a fluid and are at least generally directed toward the surface of this fluid. At least a portion of this bubble flow is converged into a first end of a conduit (e.g., some of the bubbles may actually flow vertically directly into this conduit, while other bubbles in the flow must be converged to enter the conduit). Fluid also flows into this first end of the conduit and is discharged out of a second end of the same conduit.

Various refinements exist of the features noted in relation to the third aspect of the present invention. Further features may also be incorporated in the third aspect of the present invention as well. These refinements and additional features may exist individually or in any combination. A plurality of diffusers may be utilized to generate the bubbles. The bubbles may be initially propelled in the direction of the surface of the fluid or so as to the propelled at least substantially "vertically" within the fluid (e.g., the above-noted diffusers may project upwardly toward the surface of the fluid). Convergence of at least a portion of the flow of bubbles will thereby induce a horizontal component to the motion of at least some of the bubbles in the flow. Air or any other oxygen-containing gas may be used to form the bubbles.

The apparatus discussed above in relation to the first and second aspects may be utilized in the execution of the method embodied by this third aspect.

BRIEF DESCRIPTION OF THE SEVERAL VIEWS OF THE DRAWING

FIG. 4 is a side elevation, cut-away view of the diffuser lip component of the water circulation apparatus of FIG. 1, showing the manner in which it is constructed, so as to not interfere with the flow of water as it passes outside of the diffuser.

FIG. 5 is a side elevation view of the pivoting float component of the water circulation apparatus of FIG. 1, illustrating its orientation as it fully supports the weight of the apparatus while it is in the water.

FIG. 17 is a side elevation view of the draft hose component of the water circulation apparatus of FIG. 1, illustrating the orientation of the strainer head when on the bottom of the body of water in relation to the remainder of the draft hose.

FIG. 18 is a side elevation cut-away view of the strainer head portion of the draft hose, illustrating the location of the strainer's internal components.

DETAILED DESCRIPTION OF THE INVENTION

Figure 1:
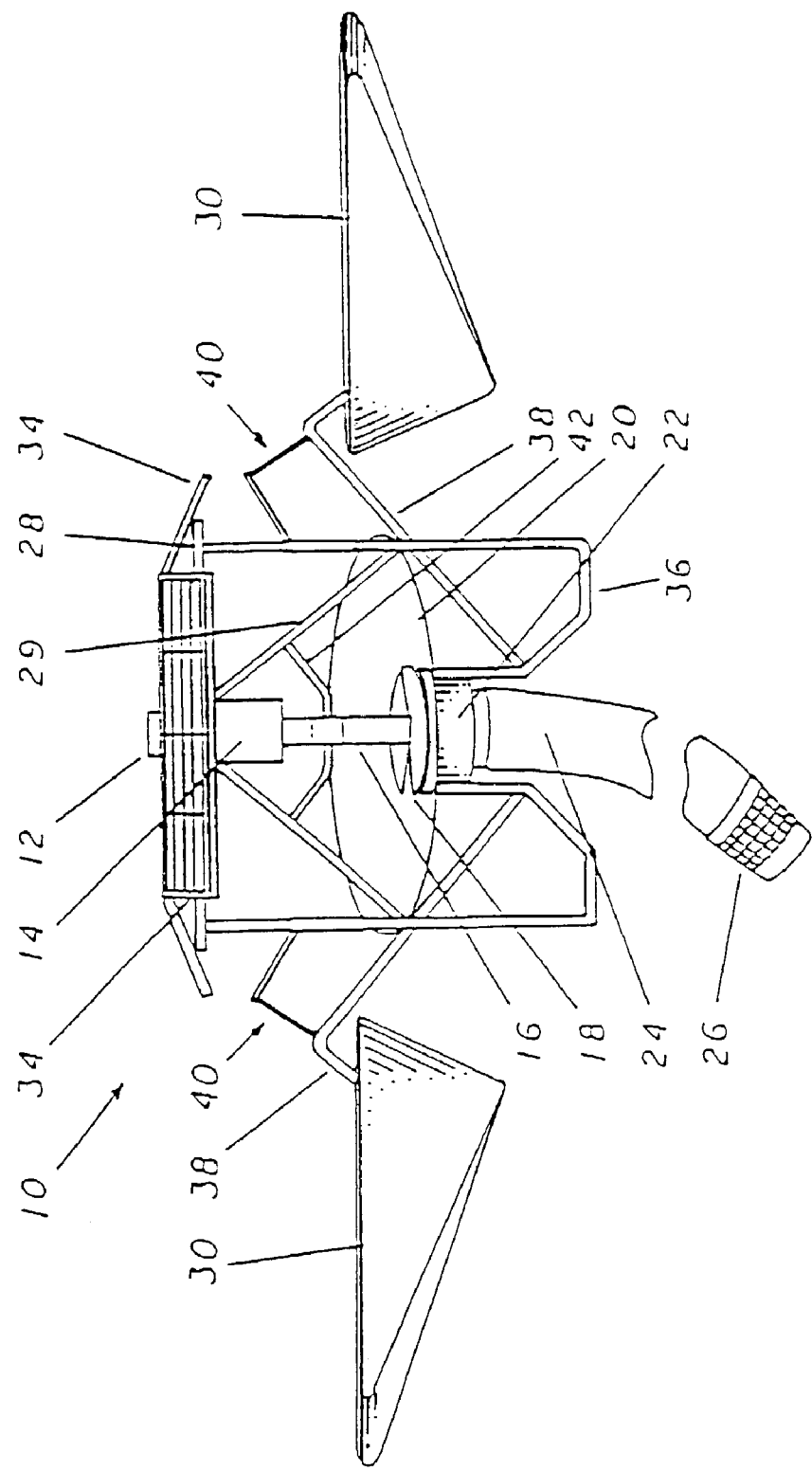
FIG. 1 is a perspective view of one embodiment of a water circulation apparatus showing the orientation of its major components and the location of the water impeller and the water diffuser in relation to the body of the apparatus.

Preface:

It is a primary objective of a first floating circulation apparatus to be described herein to provide a method of circulating bodies of water in a highly efficient manner that allows for the use of an extremely low horsepower pump.

It is an additional objective of this first floating circulation apparatus to provide a method of circulating bodies of water and thus, increase their exposure to the atmosphere through the use of an alternative source of power, such as relatively small solar panels.

It is an additional objective of this first floating circulation apparatus to combine these characteristics in a small, floating, portable device that can be placed in a desired location and left to circulate a liquid from a lower elevation to the surface.

It is an additional objective of this first floating circulation apparatus to provide a method of delivering liquid, through a distribution dish or diffuser, in a non-turbulent manner that will maximize the amount of time the liquid remains on the surface.

It is an additional objective of this first floating circulation apparatus to provide a means by which a water circulation apparatus can be used to constantly circulate a body of water during times where the surface of the body of water is prone to freezing during the nighttime hours which, with current water circulation apparatuses, tends to block the distribution of water from the diffuser of the apparatus to the surface of the body of water which in turn blocks circulation.

It is a further objective of this first floating circulation apparatus to provide such a method of anchoring such devices that will allow a water circulating device to ride up and down on the water's surface waves while being subjected to continuously alternating cycles of tug and slack in high wind conditions without interfering with its floatation characteristics or its ability to move under normal weather conditions.

It is a still further objective of this first floating circulation apparatus to provide such a water circulation apparatus which has a water pick up system that is designed in such a way so that the water pick up tube will not get tangled with the anchor line while the circulation apparatus is drifting around the surface of a body of water.

These objectives are accomplished by the first floating circulation apparatus that has as an on-board power system. This on-board power system may consist of a plurality of solar panels that produce the entirety of the power required to drive the water pump, however other power such as wind, electrical, gas or others may be used. This first floating circulation apparatus is equipped with a water impeller that is larger than, and tightly fitted over, the top of the draft tube through which the water from the pond or reservoir is drawn. By placing the impeller above and out of the draft tube, the efficiency of the pump will be greatly increased. Thus, the same amount of horsepower will move a much larger amount of liquid.

By having the impeller up and out of the draft tube, it is also possible to impart movement to the water in two different ways. First, the impeller moves water by a lifting action which is caused by the rotation of the auger-like impeller. Second, the impeller imparts a rotating motion to the water. This rotating motion will generate centrifugal force, causing even more water movement or mixing. Prior art circulation devices place the impeller down in the draft tube and thus, the rotating motion of the water is wasted as the water is trapped by the walls of the draft tube.

The first floating circulation apparatus is also equipped with a large flow distribution or diffuser dish surrounding the impeller. The size and shape of the impeller works to allow the water to move directly away from the impeller, radially. Additionally, the flow diffuser is also equipped with a specially designed outer edge which does not impede the radial flow of water created by the impeller as it passes from the diffuser to the surface of the lake or pond. This allows the first floating circulation apparatus to circulate a body of water more effectively, as the motion imparted to the water by the impeller is more efficiently passed outside of the diffuser. Thus, the centrifugal force phenomenon is utilized to create water movement at the surface which in turn operates to circulate the body of water.

The first floating circulation apparatus is also equipped with freeze slots that work in conjunction with the flow diffuser of the water circulation apparatus in situations in which the flow of water from the diffuser to the body of water is interrupted or completely blocked by the formation of ice which is a common occurrence in fall and winter mornings. The slots alleviate this blockage problem and are a plurality of relatively long and narrow slots within the surface of the diffuser. These slots provide an avenue for water to pass from the interior of the diffuser to the body of water on the outside of the diffuser. Thus, when the normal flow of water has been blocked by the formation of ice, the slots allow the water inside of the diffuser to pass out to the body of water which in turn provides the desired circulation to the water despite the ice.

Additionally, the plurality of slots of the first floating circulation apparatus do not interfere with the normal operation of the water circulation apparatus in normal, non-ice, weather conditions. Although under normal operating conditions, there is a slightly less pressure inside of the distribution dish (diffuser) versus outside the dish, causing small volumes of liquid to be drawn into the dish in the absence of ice, this reverse flow is negligible. Conversely, when there is ice blocking the normal route of passage, covering the edge of the diffuser, the rotation of the impeller creates water pressure within the diffuser which serves to force the water out of the slots and into the body of a water which effectively keeps the circulation of the body of water in progress despite the formation of ice.

The first floating circulation apparatus also employs an anchoring apparatus that is made up of a pair of weighted blocks which are connected in line by means of an anchor line to either the frame of the circulation apparatus or to one of its plurality of floats. Each of the weighted blocks is most commonly made of a concrete or concrete-like material that is of the correct density that will allow the blocks to be used as an anchor at a size that is practical to handle. Additionally, the form of the concrete blocks in no way pose any threat to the integrity of the non-permeable pond liners as it contains no sharp points or edges that can puncture or tear the liner of some ponds.

The anchoring device for the first floating circulation apparatus operates in normal weather conditions by simply sitting on the bottom of a typical pond or lagoon. In these conditions, there is no undue stress place on the line or the blocks and the most forward of the two blocks and the length of the anchor line between it and the circulation apparatus will control the position of the apparatus on the surface of the water. The problem in anchoring these types of devices is a result of less than perfect weather conditions when the wind is blowing hard and is creating waves on the surface of the water. The wave motions in these conditions operate on the circulation apparatus by constantly placing alternating tug and slack forces on the anchor. This can create a serious situation as these types of forces tend to draw the anchor across the bottom of the pond which allows the circulation apparatus to wander randomly around the surface of the pond.

The use of two anchor blocks in the first floating circulation apparatus counteracts this potential problem and keeps the circulation apparatus within its desired range of motion. This occurs because as the wind speed increases and begins to move the apparatus away from the anchor, the forward anchor is pulled forward and upward on one of its edges by the anchor line. Once this has occurred, the intermediate anchor line is drawn tight and any remaining tug force is placed on the rear anchor. The weight of the front and rear anchors together along with the frictional resistance created by the rear anchor's flat position on the liner provide more than enough anchoring force to keep the circulation apparatus in the desired location. Conversely, when the tug force is released by the passage of the wave, the front anchor will return to its normal position on the liner and this action serves to absorb the slack created in the anchor line in windy weather.

Finally, the first floating circulation apparatus is also equipped with a water pick up system that consists of a draft hose that is weighted towards its bottom end. This weight serves to keep the draft hose, and therefore the intake strainer head located at its terminus, on the bottom of the body of water directly below the center of the apparatus. As the anchor device for the first water circulation apparatus is attached through the anchor line on the outside edge of the body of the first water circulation apparatus with the line extending outward therefrom, the anchor line can never come into contact with the centrally located draft hose. This design of the anchor and water pick up systems eliminate the possibility of encountering problems due to entanglement of the anchor line and the draft hose.

A second floating circulation apparatus to be described herein may be characterized as an improvement to the design of the System. Although the second floating circulation apparatus preferably utilizes at least certain basic components of the System, the second floating circulation apparatus utilizes one or more additional components that were not part of the System.

It is the primary objective of the second floating circulation apparatus to provide an additional supply of dissolved oxygen that is independent of the surface area of the pond, while at the same time providing the ability to reaerate at distances greater than 100 feet from the distribution dish.

It is a further objective of the second floating circulation apparatus to improve the efficiency of oxygen absorption from air bubbles of a given size that are injected into the depths of water.

It is a further objective of the second floating circulation apparatus to precisely regulate and control the volume of the mixed portion of the pond.

It is a further objective of the second floating circulation apparatus to reduce the amount of growth buildup on the distribution dish.

It is a further objective of the second floating circulation apparatus to increase the mixing rate of that volume of the pond that lies between the depth of the intake and the surface of the pond.

It is a further objective of the second floating circulation apparatus to provide an adaptation of various diffusion devices that transfers air to a unique intake cone which improves the oxygen transfer rate of the oxygen supplied.

It is a further objective of the second floating circulation apparatus to provide a supplemental source of oxygen that reduces or eliminates the limitations of the System brought about by small surface areas and high oxygen-demand environments.

It is a further objective of the second floating circulation apparatus to provide an adaptation of an air driven pumping device to the type of device utilized by the System, thereby improving the water displacement and related effects of the resulting apparatus in comparison to the System.

It is a further objective of the second floating circulation apparatus to provide a combination of the air lift pump and rotating impeller, which generates spiral waves with consistent frequency, controlled amplitude, and velocity, such that wave interference is minimized.

It is a further objective of the second floating circulation apparatus to provide a specifically designed lip on the edge of the intake cone that focuses the draft zone to a horizontal narrow band of not more than six inches in thickness.

It is a further objective of the second floating circulation apparatus to provide a surface controllable intake adjustment mechanism including telescopic draft tube sections that allows the mixing of a given depth and volume of the pond.

It is a further objective of the second floating circulation apparatus to provide alternative sources of power for the blower that include, but are not limited to: a) solar panels; b) solar-battery combinations, either on the shore, in a floating vessel (including on-board the floating circulation device), or submerged in the pond; c) wind power, either on the shore or affixed to the floating circulation device; d) fuel cells, either on the shore, on the floating circulation device, or submerged; e) an internal combustion engine; and f) electrical power from shore service panels.

These and possibly other objectives are accomplished by the second floating circulation apparatus through use of a relatively low-powered air transfer device (blower) that gathers air and transfers it under relatively low pressure and high volume to at least one, and more preferably a plurality of diffusers, the configuration, arrangement, and/or location of which is specific to environmental conditions at the site, desired oxygen transfer capacity, blower size, and other factors that may be embodied in the second floating circulation apparatus. Each diffuser directs its oxygen flow at least generally upwardly into an intake structure.

The intake structure or dish is designed in a conical form (funnel shaped, with the larger diameter portion being disposed at a greater depth in the body of water) with a horizontal lip on its lower extreme with a specific dimension such that entering water will be drawn, without obstruction from the draft tube, radially inward from a thin horizontal zone at the same depth as the horizontal lip. The horizontal draft zone is limited to about six inches in vertical dimension and extends from the pond embankment to the intake dish.

When the injected air exits the diffusers, bubbles are formed and begin to rise within the conical intake structure. As they rise, the bubbles are concentrated by the constriction of the conical form of the intake structure. Bubbles produced at the outer perimeter of the intake dish rise until they approach the more horizontal inside surface of the intake dish. These outside bubbles then begin to migrate along the upward slope of the intake dish at a relatively lower speed than the bubbles produced at the center of the intake dish where there is no restriction to their vertical ascent. The upward restriction increases the time and distance that the bubbles remain submerged, thereby increasing the efficiency of the absorption of oxygen from the bubbles into the adjacent water.

The movement of the bubbles in the water tends to "drag" the adjacent water with them. As the concentrated air bubbles from the perimeter and the center diffusers enter the vertical draft tube, their upward velocity, along with the flow of water, is accelerated in the relatively smaller diameter of the draft tube. The increased velocity of the column of water inside the draft tube relative to the water outside of the tube, effectively decreases the water pressure inside the draft tube (Bernoulli's principle). The decreased water pressure gradient in the draft tube slightly reduces the capacity of the water to dissolve oxygen (concentration, mg/L) compared to the water outside the draft tube at a given depth. However, the lowered pressure allows the bubbles, that originally contained a fixed volume of oxygen, to expand more than they would have if rising outside the draft tube, increasing their surface area. The net effect is an increased rate of oxygen absorption by the rising column of water. Besides increasing the rate and efficiency of oxygen transfer over that of undirected rising bubbles, this design greatly increases the DMD, and consequently, the induced flows, and ultimately, the mixing capability over that of the System.

As the rising water containing dissolving air bubbles passes through the impeller zone, the impeller, which is independently powered by a continuous current source, imparts a pulsing action resulting in the creation of waves in the water exiting the distribution dish. The amplitude of the waves can be regulated to a degree and are consistent and non-interfering, thereby increasing the mixing of the fluid contents of the pond.

Near-laminar flow is established at the edge of the distribution dish that progresses radially outward in thin sheets to the pond embankment. The undissolved portion of the bubbles are contained in the water for some distance from the distribution dish, until they are completely absorbed into the water or until they have escaped into the atmosphere.

Because the water exiting the dish is oxygen-rich, diffusion begins immediately upon exiting the distribution dish and continues until the supply reaches equilibrium with the concentration of dissolved oxygen in the water under the surface. At that distance from the distribution dish, as the surface layer is still flowing toward the embankment and inducing upward flows of oxygen-deficient water, it will absorb pure oxygen from the atmosphere in the same manner as described in International Publication No. WO/0071475 A1.

Because the DMD displacement of the second circulation apparatus is greater than that of the System, the induced flows that are dependent upon DMD are increased; resulting in proportionately higher reaeration rates than that of the System.

Because the design of the intake structure limits the draft to a very narrow, unobstructed, horizontal zone within the pond depths in the case of the second circulation apparatus, and the elevation of the intake lip can be adjusted (depth control), the circulated volume can be adjusted to suit the desired operating objectives.

Because the waves produced by the second circulation apparatus have a relatively higher amplitude than those that are produced by the System, the benefits dependent upon waves including but not limiting to: mixing, reaeration, surface tension reduction, and evaporation are improved over those derived from waves with less amplitude. The generation of waves that spiral outward in a consistent, progressive manner, by which wave interference is minimized, is an important aspect of the embodiments of the second floating circulation apparatus.

Because of the increased velocity and volume of water flowing over the distribution dish and because it is oxygen-rich in the case of the present invention, growth buildup on the dish will be reduced over that experienced in lower velocities and lower dissolved oxygen concentrations in the water.

DESCRIPTION OF EMBODIMENTS

Figure 2:
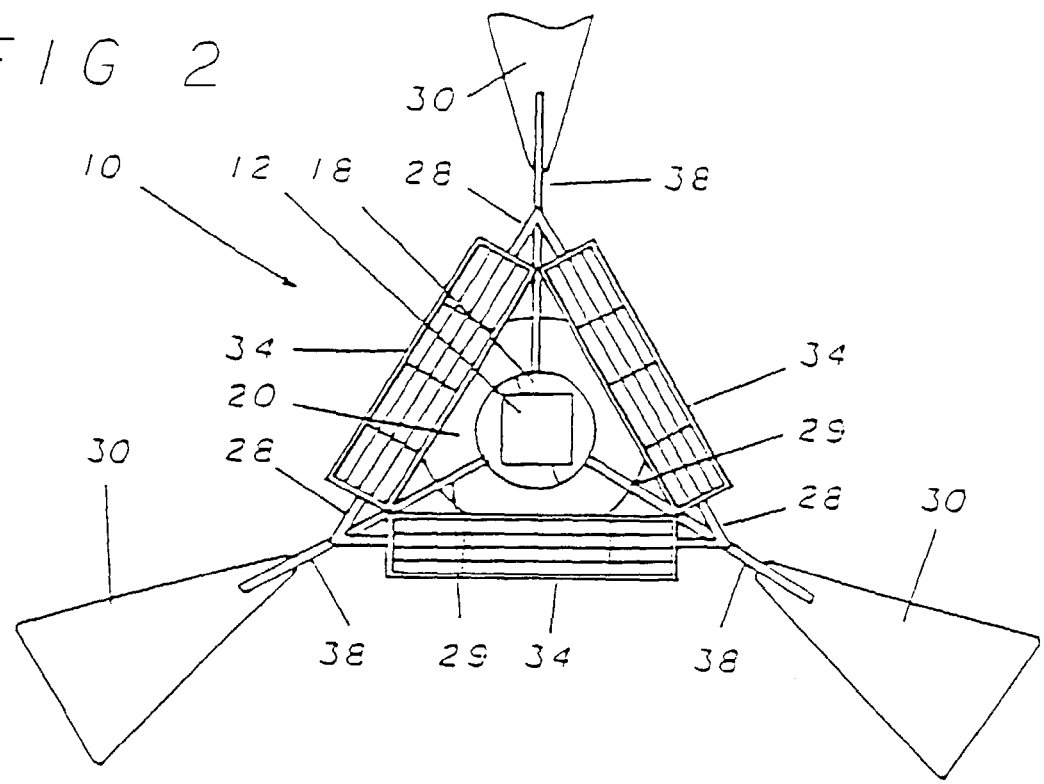
FIG. 2 is a top elevation view of the water circulation apparatus of FIG. 1, showing the orientation of the impeller and the diffuser to the solar panels and the floats.

The present invention will now be described in relation to the accompanying drawings which at least assist in illustrating its various pertinent features. Referring now to the drawings and more specifically to FIGS. 1 and 2, the floating water circulation apparatus 10 is made up of a triangular frame member 28 which provides the structure to which the other components of the water circulation apparatus 10 are attached. The triangular frame member 28 has extending in an outwardly manner from each point of the triangle the pivoting float arms 38 which in turn provide the attachment point for the plurality floats 30. These floats 30 are positioned at the outer edge of the triangular frame member 28 which provides a greater degree of stability for the water circulation apparatus 10 when placed in a body of water and also serves as lever arms to counteract any rotational forces applied to the water circulation apparatus 10. The outward location of the floats 30 also serves to keep them from interfering with the flow of the circulated water. The floats 30 are pivotally attached to the lower surface of the pivoting float arms 38 and serve to hold the triangular frame member 28 of the water circulation apparatus 10 in a horizontal position above the surface of the body of water to be circulated.

The triangular frame member 28 provides for the mounting of the primary components of the water circulation apparatus 10 at its center. This is accomplished by having a plurality of inner support bars 29 extending inward from the triangular frame member 28 and attaching to the exterior of the impeller shaft housing body 16. This attachment (which will be discussed in further detail below) serves to vertically suspend the impeller shaft housing body 16, and all other components attached to it, within the central portion of the triangular frame member 28. The result of this configuration is that the triangular frame member 28 and the floats 30 work in conjunction to hold the primary components of the water circulation apparatus 10 in the proper position relative to the body of water.

The primary components of the water circulation apparatus 10 are all attached to the triangular frame member 28 through the impeller shaft housing body 16. The end of the electric drive motor 12, which supplies the rotational force necessary to pump water, is mounted to the upper most end of the impeller shaft housing body 16. The electric drive motor 12 is equipped with a gear reduction system that allows the electric drive motor 12 to spin at a high RPM, but reduces to a substantially lower RPM at the impeller 18. This allows the use of a relatively low voltage electric drive motor 12 as the lower RPM of the gear reduction system provides sufficient torque at the impeller to rotate it even at slow speeds.

Directly below the electric drive motor 12 on the impeller shaft housing body 16 is the electronic control box 14 which is made up of a sealed box or "potted" to ensure that the electrical components contained within will operate in wet conditions and will continue to control the flow of water through the impeller 18. The electronic control box 14 contains a linear current booster which takes the supplied voltage and amperage and varies their values to match the requirements of the electric drive motor 12. The most common example of this is that the electronic control box 14 will convert excess voltage to amperage, which allows the electric drive motor 12 to run for a longer period of time or at a higher speed on cloudy or hazy days.

The power necessary to run the water circulation apparatus 10 is supplied by a plurality of solar panels 34 which are mounted along each edge of the triangular frame member 28. The solar panels 34 are each mounted above the upper surface of the triangular frame member 28 at a slight downwardly facing angle of approximately 20 degrees which aids in keeping the face of the solar panels 34 free from debris and rain or heavy dew will have the effect of washing the surfaces clean. Additionally, the triangular orientation of the solar panels 34 ensures that the equivalent of two full panels are always producing power regardless of the position of the water circulation apparatus 10 on the water with respect to the location of the sun. In one embodiment of the water circulation apparatus 10, each of the solar panels 34 produces 55 watts of electric power and the electric drive motor 12 requires 110 watts to operate at its maximum capacity. The positioning of the solar panels 34 on the triangular frame member 28 ensures that the electric drive motor 12 will always have enough power to operate in an efficient manner. It must be stated at this point that other sizes of solar panels 34 and electric motor 12 may be used to optimize the water circulation apparatus 10 for any given size pond.

The triangular frame member 28 of the water circulation apparatus 10 is also equipped with support legs 36 which extend downward into the body of water. These support legs are also individually attached to the outer most edge of the flow diffuser 20 which helps to secure the flow diffuser 20 in the proper orientation, within the body of the water circulation apparatus 10. Additionally, the support legs 36 also provide a means of support for the present invention in the event that the body of water is emptied or dries up or for storage purposes.

The impeller shaft housing body 16 extends downward from its point of attachment with the inner support bars 29 to a point just above the water impeller 18. The water impeller 18 is located directly above the upper opening of the draft tube 22. It is important to note that the opening of the draft tube 22 is slightly smaller in diameter than the outside diameter of the water impeller 18. This configuration serves to create a more efficient pump as the larger diameter impeller 18 creates a partial seal over the smaller draft tube 22 opening which does not allow water to re-circulate back down into the draft tube 22. This configuration results in a more efficient pumping action. The draft tube 22 is then connected at its lower most end to the draft hose 24 which extends down into the body of water to the desired depth. The lowest end of the draft hose 24 is equipped with a debris strainer 26 which ensures that no unwanted debris will enter and clog the water circulation apparatus 10.

As the impeller 18 is rotated by the electric drive motor 12 it draws up water from the bottom of the body of water through the draft hose 24 and draft tube 22. Once the water passes through the water impeller 18 it enters the large bowl shaped flow diffuser 20 which is attached to the upper edge of the draft tube 22 and extends upward and outward therefrom. The flow diffuser captures the water as it leaves the draft tube 22 and gently directs the water, so as not to decrease overall efficiency, directly on to the surface of the water. The result of this is that an outward motion is created on the surface, which then causes induced flow, causing the entire body of water to go into motion.

Figure 3:
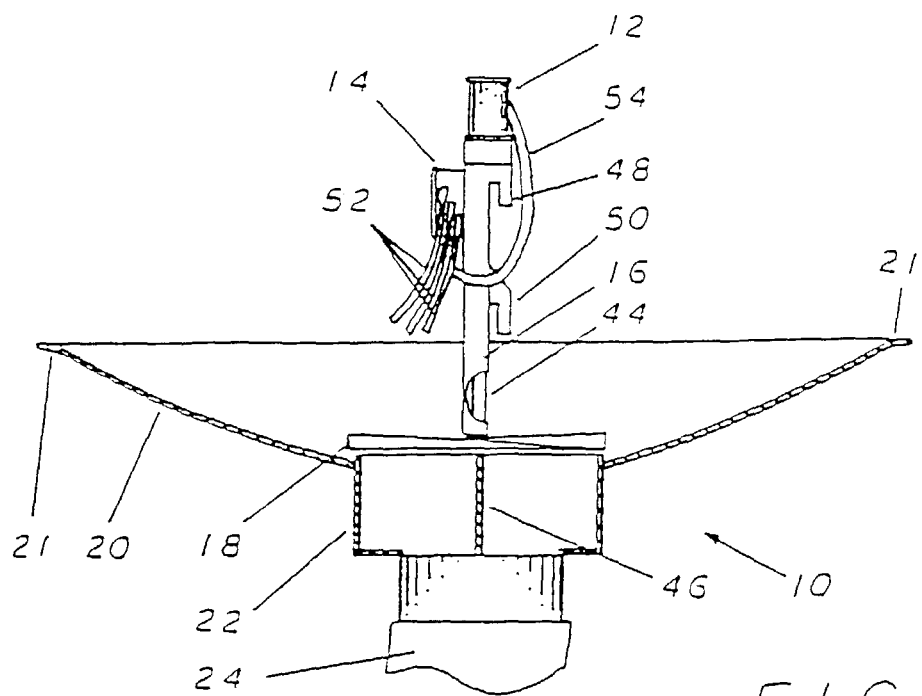
FIG. 3 is a side elevation cut-away view of the internal structure of the water circulation apparatus of FIG. 1, showing the manner of construction of the impeller drive freeze sleeve and the draft tube and water flow divider.

Conversely, the rotating motion below the impeller 18 tends to diminish the efficiency of the pumping action. The water circulation apparatus 10 employs a device to counteract this effect which is illustrated in FIG. 3. The draft tube 22 is equipped with a flow diverter vane 46 which dissects its interior into two equal parts. The flow diverter vane 46 limits the circular flow of water within the draft tube 22 and by this, increases the efficiency of the water impeller 18 as it rotates just above the flow diverter vane 46 with very little clearance between the two. This ensures that most of the energy used to generate motion in the water within the flow diffuser 20 is transferred through the water over the surface of the water being circulated.

Figure 7:
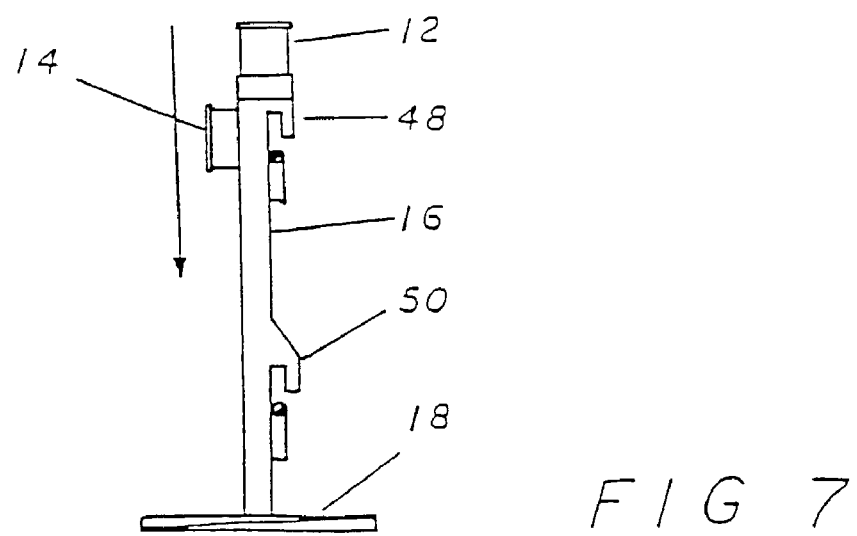
FIG. 7 is a side elevation view of the impeller shaft housing body component of the water circulation apparatus of FIG. 1, illustrating the manner in which it is designed that allows it to be quickly and easily removed from and installed on the frame members of the apparatus.

The construction of the impeller shaft housing body 16 (along with other features of the water circulation apparatus 10) is also illustrated in FIG. 3 which shows the location of the impeller drive shaft 44 within the impeller shaft housing body 16. The water impeller 18 is connected directly to the impeller drive shaft 44, not to the impeller shaft housing body 16, and is suspended in a cantilever manner by the impeller drive shaft 44. The connection of the impeller shaft housing body 16 to the triangular frame member 28 of the water circulation apparatus 10 (which is further detailed in FIG. 7) is accomplished by the use of the upper shaft attachment hook 48 and the lower shaft attachment hook 50 both of which are protrusions from the side of the body of the impeller shaft housing body 16 which have downwardly oriented slot-like openings. It is into these openings that the inner support bars 29, which fit inside of the slot of the upper shaft attachment hook 48, and the lower shaft attachment bars 42, which fit into the slot of the lower shaft attachment hook 50, slip into to hold the entire central assembly of the water circulation apparatus 10 in place.

On the other hand, to remove the impeller shaft housing body 16 (and therefore the impeller 18, the electric motor 12, and the electronic control box 14) one simply lifts up on the impeller shaft housing body 16 until the slots of the upper and lower shaft attachment hooks, 48 and 50, are clear of the inner support bars 29 and the lower shaft attachment arms 42 respectively. This system of attachment for the impeller shaft housing body 16 and all of the components of the water circulation apparatus 10 that are attached to it, allow for easy removal from the body of the water circulation apparatus 10 for service or replacement.

The electronic control box 14, which is mounted to the upper side of the impeller shaft housing body 16, serves to contain all of the electronic controls for the water circulation apparatus 10. In this capacity, there are a plurality of control wires that run to and from the electronic control box 14. The first of these are the plurality of panel to control box feed lines 52 which connect the solar panels 34 to the electronic control box 14 and transmit the energy generated in the solar panels 34 to the electronic control box 14. This energy is then processed by the electronic control box 14 and sent to the electric drive motor 12 by use of the box to motor feed wire 54. Thus, the electric drive motor 12 uses energy created by the solar panels 34 to drive the impeller 18, causing the body of water to be circulated.

Figure 8:
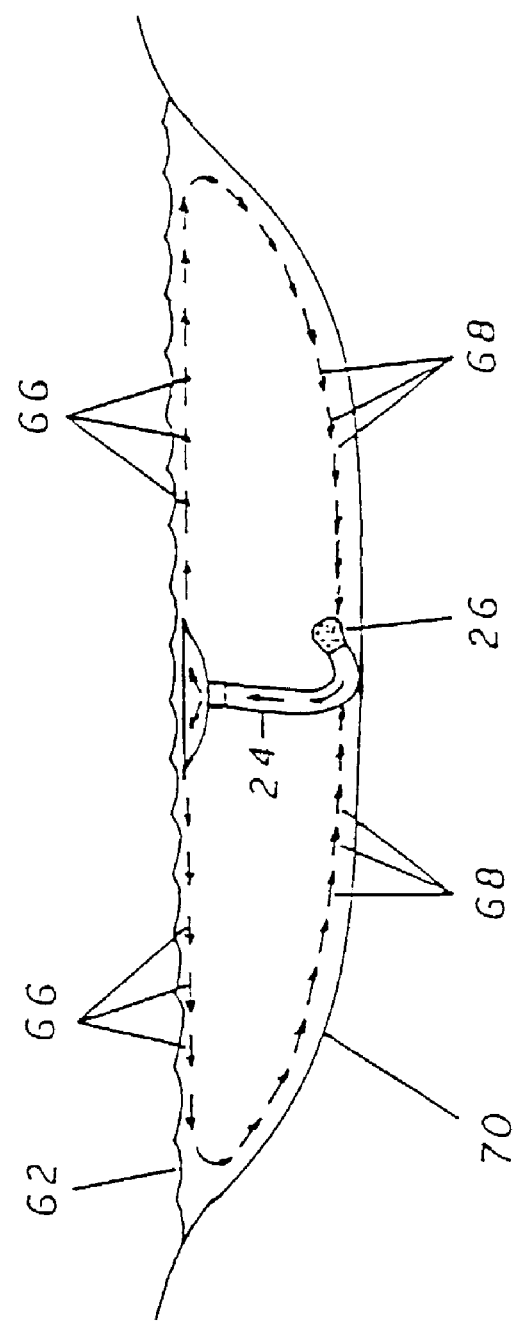
FIG. 8 is a side elevation view of the water circulation apparatus of FIG. 1, diagramming the manner in which the water flows in a laminar fashion both from the flow diffuser on the surface of the water and to the draft tube below the surface of the water.

The primary function of the water circulation apparatus 10, to circulate the water contained in lakes or ponds, is best illustrated in FIG. 8. As the impeller 18 of the water circulation apparatus 10 rotates, it drives the process which circulates water throughout the body of the pond 70, that eventually allows the water to become oxygenated naturally. This ensures that the body of water will remain in a healthy state by keeping the levels of algae in the proper ratio to the size of the pond 70.

Figure 9:
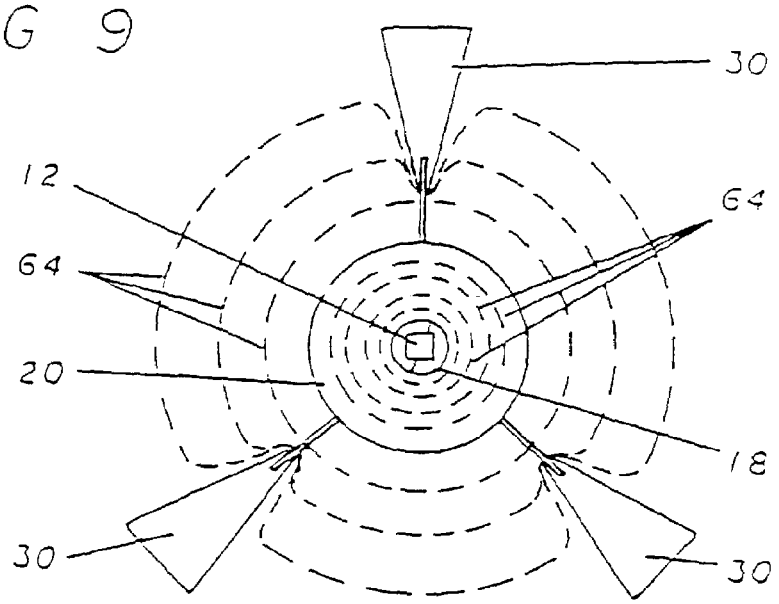
FIG. 9 is a top elevation view of the water circulation apparatus of FIG. 1, diagramming the manner in which the water leaves the flow diffuser in concentric circles of laminar flowing water.

The process of oxygenating the water occurs as a result of a plurality of events occurring at the same time. The first of these is that the rotation of the impeller 18 forces water out of the flow diffuser 20 over the laminar flow diffuser lip 21 creating the surface laminar flow 66. The surface laminar flow 66 is a very thin layer of water flowing on the surface at a very low velocity. Additionally, the surface laminar flow 66 occurs in a radial manner from the water circulation apparatus 10 (an occurrence that is best illustrated in the diagram in FIG. 9) which ensures that it will eventually extend to all portions of the surface of the pond 70.

While the surface laminar flow 66 is being forced out of the water circulation apparatus 10 at the surface of the pond 70, an additional layer of water is being drawn into the draft hose 24 through the strainer 26 below the surface of the pond 70. This layer of water, which acts in much the same manner as the surface laminar flow 66, is called the under water laminar flow 68 and it is the water that is drawn up the draft hose 24 to be re-circulated by the impeller 18. The under water laminar flow 68 is a very thin layer of water that is flowing at a very low velocity. Finally, as the draft hose 24 draws this layer of water equally from all portions of the pond 70, the water is moving towards the draft hose 24 in a radial manner, which ensures that all the water in the pond 70 is involved in the circulation process.

The action of the surface laminar flow 66 and the under water laminar flow 68 creates an induced flow in the rest of the water contained in the pond 70. The induced flow means that as water molecules that are contained within the surface and under water laminar flows, 66 and 68, move away from or towards the water circulation apparatus 10, they are replaced by other water molecules contained in the body of the pond 70. This action causes all of the water to eventually be drawn into the circulating action driven by the impeller 18 of the water circulation apparatus 10. The result of this is that over time, all of the water in the pond 70 will reach the surface where it will come into contact with the atmosphere. Once the water contacts the atmosphere, it will absorb oxygen naturally, thus, oxygenating the entire pond 70.

The water dispersion and circulation function of the water circulation apparatus 10 is also enhanced by the use of the laminar flow diffuser lip 21 which forms the outermost edge of the flow diffuser 20 and which is further detailed in FIG. 4. The laminar flow diffuser lip 21 functions to lessen the difference between the water within the flow diffuser 20 and the water outside of it. This is accomplished by constructing a lip that is different than the body of the flow diffuser 20.

Figure 10:
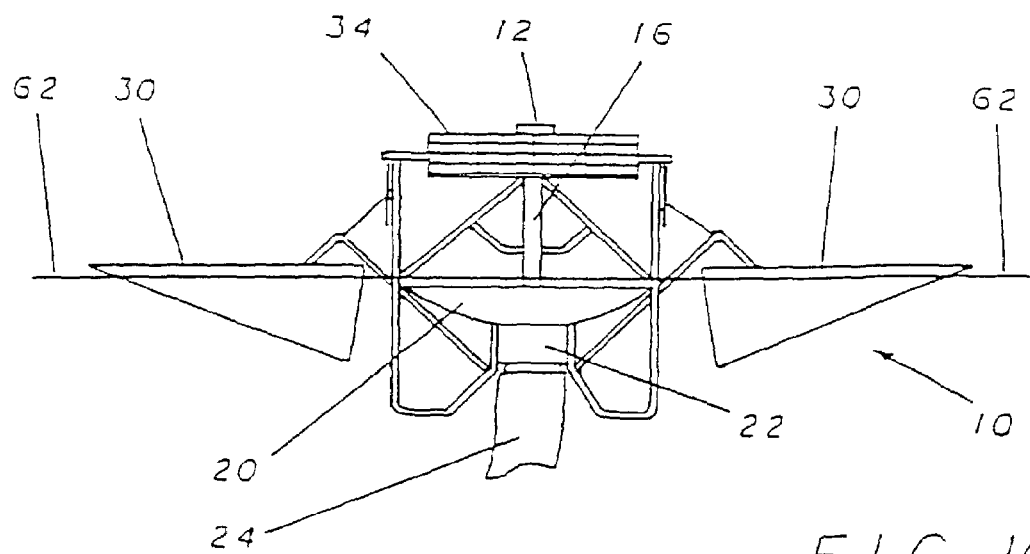
FIG. 10 is a side elevation view of the water circulation apparatus of FIG. 1, illustrating the positioning of the flow diffuser just below the surface of the water when the apparatus is in use.

Additionally, the body of the flow diffuser 20 sits below the water line 62 when the water circulation apparatus 10 is placed in a lake or pond 70 which is illustrated in FIG. 10. This relative position of the flow diffuser 20 in relation to the water line 62 further enhances the function of the laminar flow diffuser lip 21 as it allows waves of water moving outward from the impeller 18 to pass freely between the laminar flow diffuser lip 21 and the water line 62.

Therefore, as water passes from the interior of the flow diffuser 20 to open water, the laminar flow diffuser lip 21 interacts with it as little as possible so that the motion imparted upon the water by the impeller 18 is not disrupted by the passing from the body of the diffuser 20 to the open water, which allows the water circulation apparatus 10 to operate at maximum efficiency. This function of the laminar flow diffuser lip 21 is further illustrated in FIG. 9 which clearly shows how the concentric waves 64 created by the rotation of the impeller 18 pass freely from the body of the flow diffuser 20 to the open water of the lake or pond. These features of the water circulation apparatus 10 ensure that the maximum amount of water possible is circulated by the rotation of the impeller 18.

Figure 6:
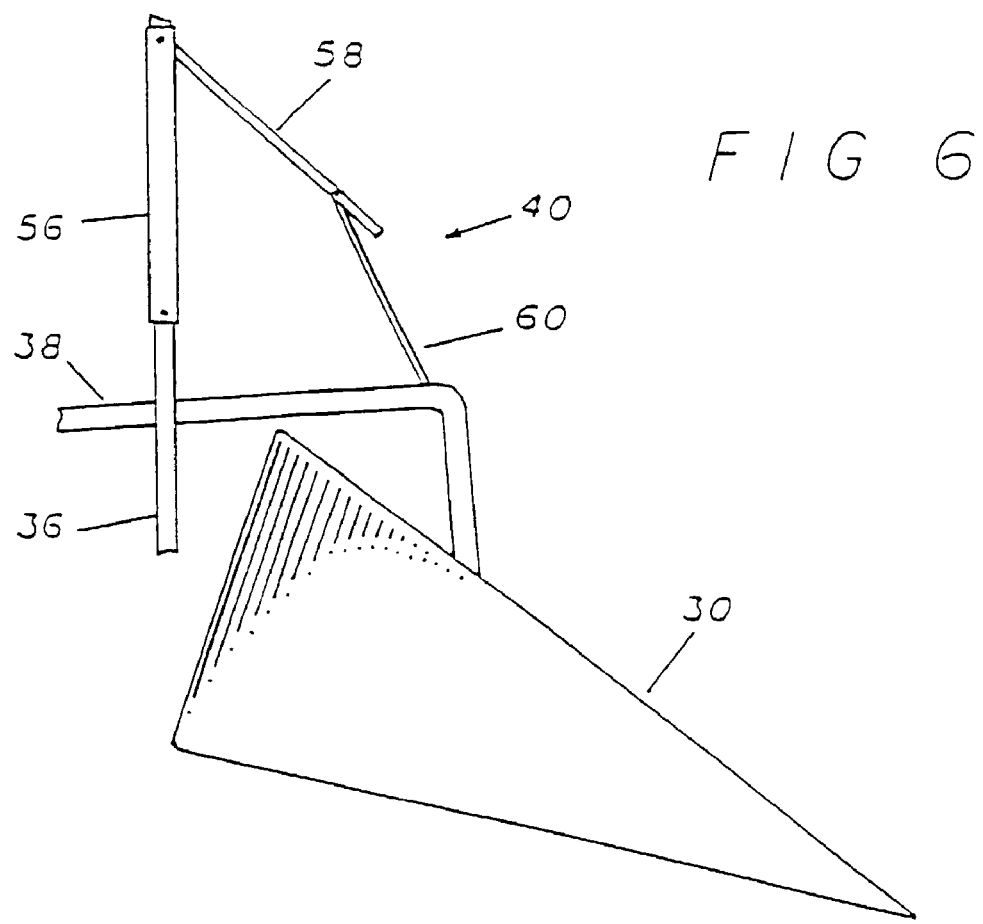
FIG. 6 is a side elevation view of the pivoting float component of the water circulation apparatus of FIG. 1, illustrating its orientation when the body of the apparatus is out of the water and the floats are not used to support its weight.

The floats 30 and float support apparatuses of the water circulation apparatus 10 are constructed in a manner that allows the floats 30 to pivot in regards to the central body of the water circulation apparatus 10 and this mechanism is illustrated in FIGS. 5 and 6. The float 30 itself is pivotally attached at its most inward end (in relation to the body of the water circulation apparatus 10) to the most outward end of the pivoting float arm 38 which is in turn pivotally attached at its most inward end to the inner sections of the support legs 36 of the water circulation apparatus 10. Additionally, at the point of attachment of the floats 30 to the pivoting float arms 38, the pivoting float arms 38 are formed into a downwardly oriented ninety degree bend. The purpose of this bend is that it allows the float 30 to pivot freely without any interference from the body of the pivoting float arm 38.

The floats 30 and the pivoting float arms 38 are also equipped with a pivoting float arm support 40 which helps to keep the floats 30 in the proper position in relation to the body of the water circulation apparatus 10. The pivoting float arm supports 40 are made up of three components and span the distance between the outer portion of the support legs 36 and the most outward end of the pivoting float arm 38. The portion of the pivoting float arms 38 that are attached to the support legs 36 are called the float arm support attachment bars 56, they extend along a portion of the outer edge of the support legs 36 above the level that the floats 30 rest when they are in their upward position. The uppermost end of these float arm support attachment bars 56 have pivotally attached to them the upper pivoting float support bars 58 which extend outward from this point of attachment. Finally, the upper pivoting float support bars 58 have pivotally attached to them towards their outer ends the lower pivoting float support bars 60 which extend downward to the point where they are pivotally attached to the upper edge of the pivoting float arm 38.

The function of the pivoting float arm support 40 is best shown in the differences between the illustrations in FIG. 5 and FIG. 6. In FIG. 5 the floats 30 are in an upward position which most commonly occurs when the water circulation apparatus 10 is in the water and the floats 30 are supporting its entire weight. Conversely, when the water circulation apparatus 10 is out of the water for storage the floats 30 drop down as illustrated in FIG. 6. The pivoting float arm supports 40 help to guide the pivoting float arm 38 through this pivoting motion and ensure that the floats 30 remain in the correct orientation in relation to the body of the water circulation apparatus 10.

Figure 11:
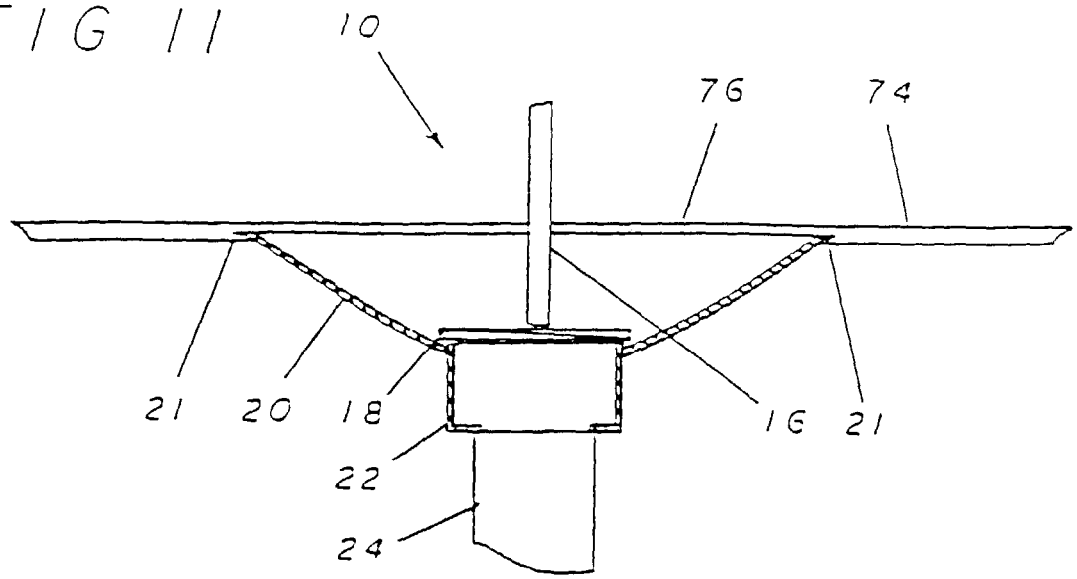
FIG. 11 is a side elevation cut-away view of a typical flow diffuser from which the flow of water has been blocked by the formation of ice.
Figure 12:
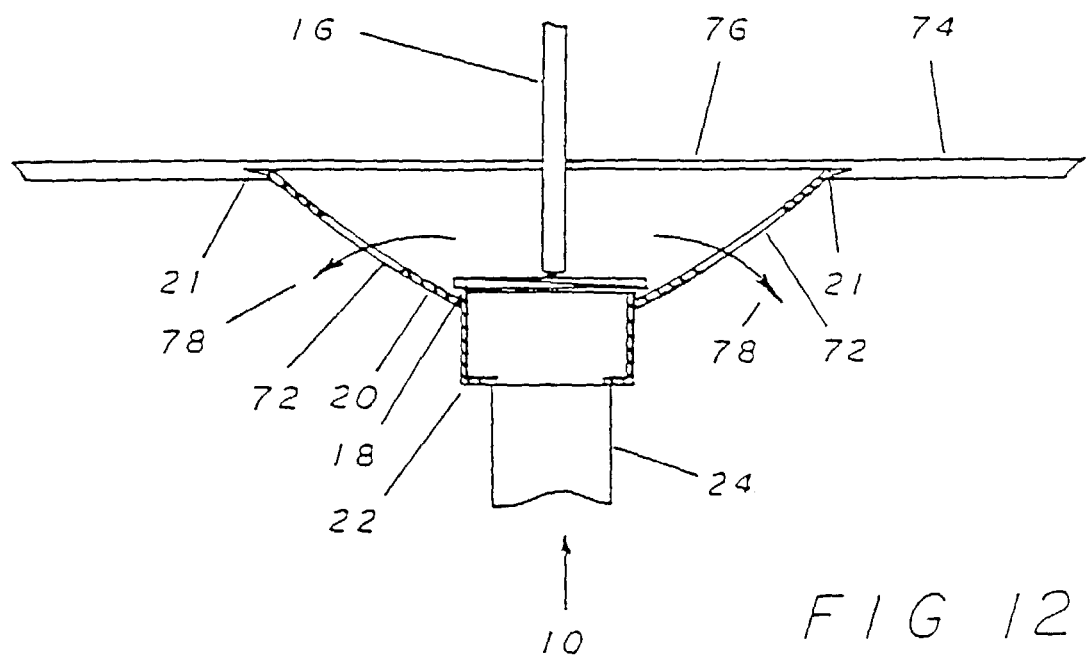
FIG. 12 is a side elevation cut-away view of a flow diffuser that is equipped with freeze slots which allow for the passage of water from its interior to the body of water despite the formation of ice.

The manner in which a layer of ice 74 interacts with a floating water circulation apparatus 10 and how the freeze flow slots 72 of the water circulation apparatus 10 function to allow for the continued circulation of water in these circumstances are illustrated in FIGS. 11 and 12. In FIG. 11 a layer of ice 74 has formed over the diffuser 20 of the circulation apparatus 10 which has formed an ice dam 76 and has entirely closed off the interior of the diffuser 20 at the diffuser lip 21 from the open pond. This condition traps the water within the diffuser 20 which effectively renders the water circulation apparatus 10 as ineffective as the water being drawn up through draft tube and hose, 22 and 24, and driven by the impeller 18 cannot pass into and circulate through the pond.

Conversely, the diffuser 20 illustrated in FIG. 12 has been equipped with a plurality of freeze flow slots 72 which allow for a path from the interior of the diffuser 20 to the exterior. Thus, when there is an ice dam 76 formed over the diffuser 20 due to cold weather, the freeze slots 72 allow water to flow (the direction of this flow is indicated through the use of the arrows marked as number 78) from the diffuser 20 to the rest of the water in the pond. This direction of flow 78 is ensured because as the impeller 18 rotates in what is effectively a closed off space, pressure builds within the diffuser which forces the water out through the freeze slots 72. Moreover, the presence of the slots 72 does not impair the effectiveness of the water circulation apparatus 10 in normal weather conditions as there is no build up of pressure within the diffuser so the water simply takes the path of the least resistance which is over the diffuser lip 21 and into the pond.

Figure 13:
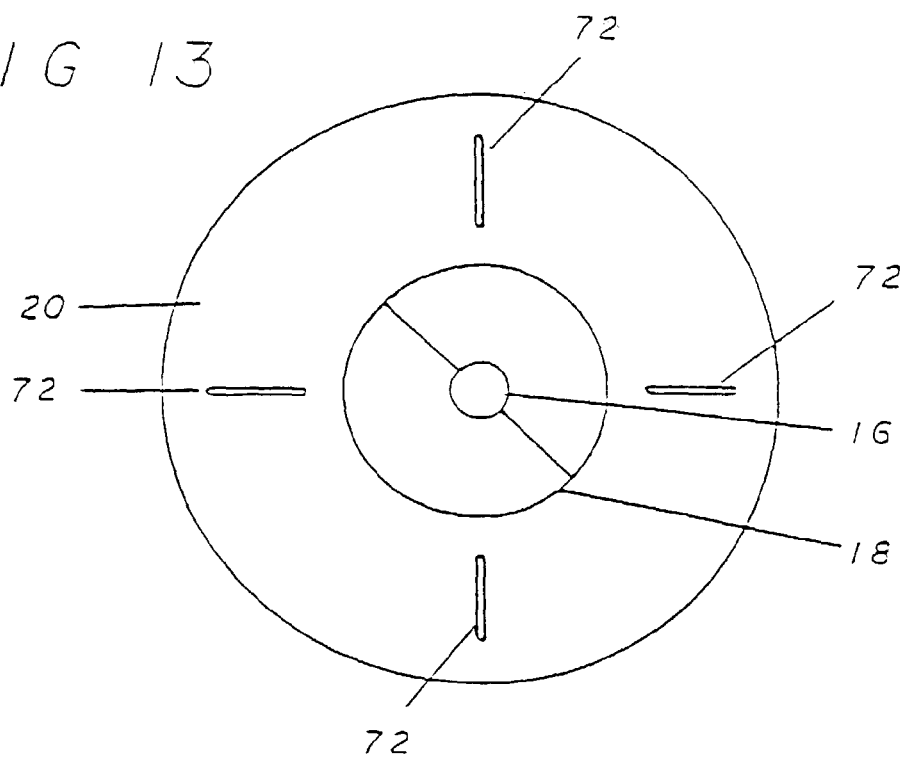
FIG. 13 is a top elevation view of a flow diffuser that is equipped with the water circulation apparatus of FIG. 1, illustrating one possible orientation of the plurality of slots with the surface of the diffuser.
Figure 14:
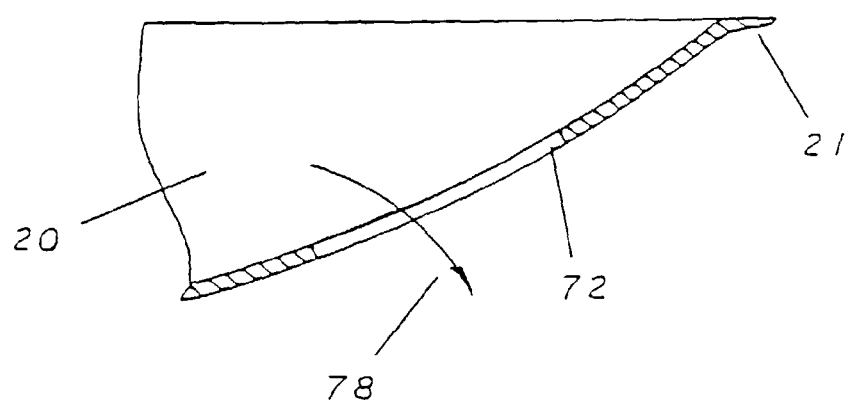
FIG. 14 is a side elevation cut-away view of a flow diffuser that is equipped with the water circulation apparatus of FIG. 1, illustrating an individual slot's orientation in the diffuser and the manner in which it is formed in the body of the diffuser.

The orientation of the freeze flow slots 72 within the diffuser 20 and their manner of construction are further illustrated in FIGS. 13 and 14. As shown, the plurality of freeze slots 72 can be positioned radially in the body of the diffuser 20 around the centrally positioned impeller 18. The freeze slots 72 pass entirely through the body of the diffuser 20 which allows for free water flow 78 from the interior of the diffuser 20 to its exterior. Additionally, it is important to note that this particular arrangement of the freeze slots 72 within the diffuser 20 is only one of many possible variations in size, location, and orientation all of which may work equally as well as the other and the one shown here is simply depicted for illustrative purposes.

Figure 15:
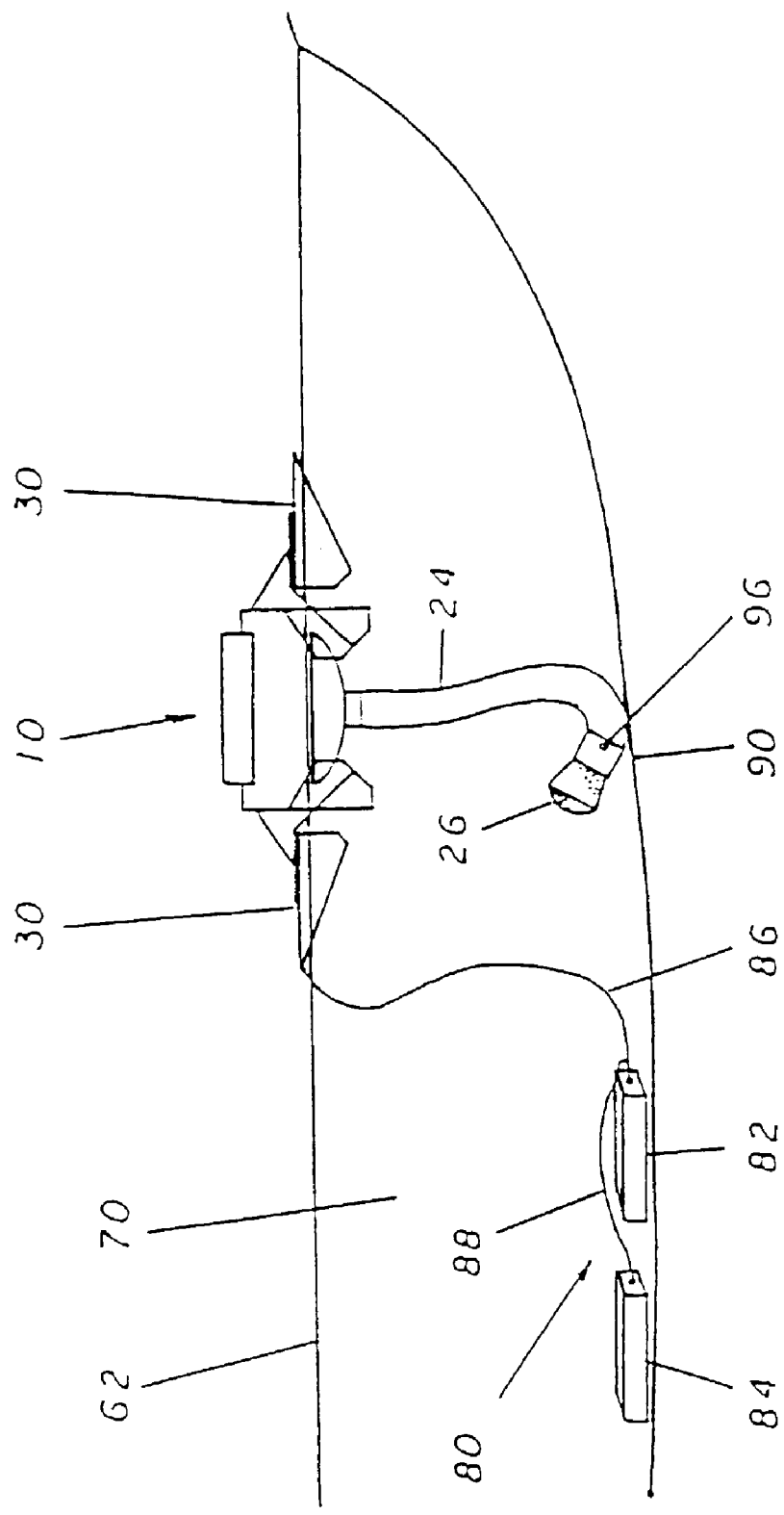
FIG. 15 is a side elevation representational view depicting the use of the water circulation apparatus of FIG. 1, illustrating its orientation in normal, or non-windy, weather conditions.
Figure 16:
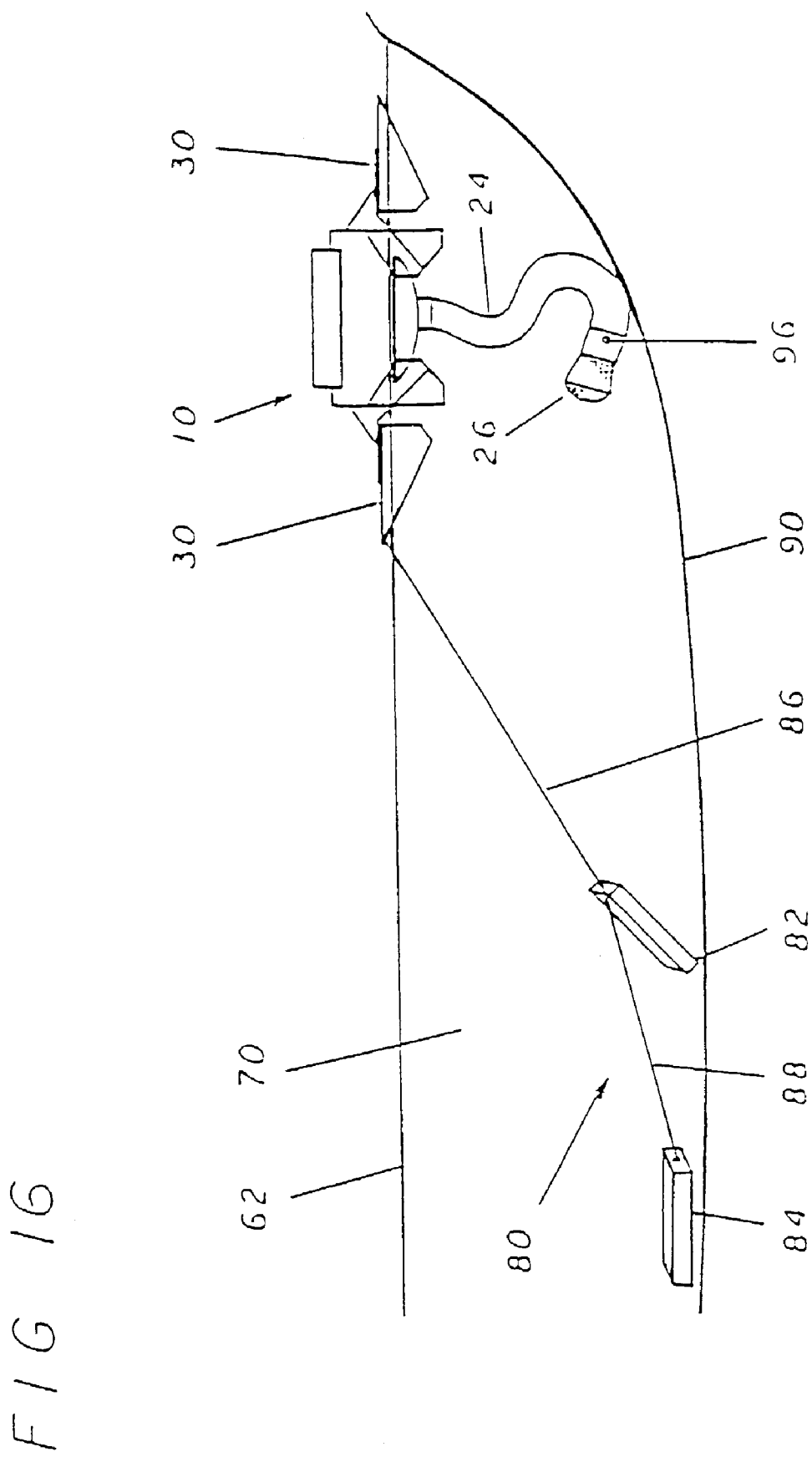
FIG. 16 is a side elevation representational view depicting the use of the water circulation apparatus of FIG. 1, illustrating its orientation in abnormal, or windy, weather conditions.

The anchor 80 for water circulation apparatus 10 is illustrated in FIGS. 15 and 16 and is made up of a pair of weighted blocks, the front anchor 82 and the rear anchor 84, that are connected in sequence by means of an anchor line 86 and the intermediate line 88 to either the frame 28 of the circulation apparatus 10 or to one of its plurality of floats 30. Each of the front an rear anchors, 82 and 84, is commonly made of concrete, or of an alternate concrete-like material, and is of the correct structural density that will allow the blocks to be used as an anchor for the water circulation apparatus 10 at a size that is practical to handle.

Additionally, the front and rear anchor blocks, 82 and 84, are formed in a manner so that they have no sharp points or edges. This is important to the function of the water circulation apparatus 10 in that a water circulation apparatus 10 is commonly used in a bodies of water 70, such as lagoons and other water treatment facilities, which have non-permeable liners 90 between the water and the earth. The purpose of these liners 90 is to ensure that any contaminates contained in the body of water 70 are not transferred to the surrounding earth or ground water. Therefore, the relatively smooth sharp of the front and rear anchors, 82 and 84, ensures that the liner 90 will not be punctured or torn which would allow the water to enter the surrounding earth which makes a water circulation apparatus 10 that is equipped with the water circulation apparatus 10 completely safe to use in lined bodies of water 70.

The dual anchor blocks operate as an anchor for use with a water circulation apparatus 10 in normal weather conditions by simply sitting on the bottom of the body of water 70 on top of the liner 90 of a typical pond or lagoon. In these conditions, there is no undue stress place on the anchor line 86 or the front anchor block 82 and the length of the anchor line 86 between it and the water circulation apparatus 10 will control the position of the circulation apparatus 10 on the surface of the water 62. This configuration leaves the water circulation apparatus 10 to move freely about in the body of water 70 contained only by the anchor line 86 and the relative position of the front anchor 82 on the liner 90.

The problem that is addressed herein comes about when the weather conditions are less than perfect and, more specifically, when the wind is blowing hard and is creating waves on the surface of the water 62. The problem in these weather conditions is the wave motion operating on the water circulation apparatus 10 constantly places alternating tug and slack forces on the anchor 80. This can create a serious situation as these types of forces tend to draw the anchor 80 across the bottom of the body of water 70 which can allow the water circulation apparatus 10 to wander outside of its intended confines. This is obviously an unwanted circumstance as the water circulation apparatus 10 may come into contact with the shore or other object which could result in damage to it.

The dual anchor 80 used with the water circulation apparatus 10 counteracts this potential problem and keeps the water circulation apparatus 10 within its desired range of motion on the surface of the body of water 70 which is being circulated. This occurs because as the wind speed increases and begins to move the circulation apparatus 10 away from the anchor 80, the front anchor 82 is pulled forward and upward on one of its edges by the anchor line 86. Once this has occurred, the intermediate anchor line 88 is drawn tight and any remaining tug force is then placed on the rear anchor 84. The weight of the front and rear anchors, 82 and 84, together along with the frictional resistance created by the rear anchor's 84 flat position on the liner 90 provide more than enough anchoring force to keep the water circulation 10 apparatus in the desired location.

Conversely, when the tug force on the anchor line 86 is released by the passage of the wave, the front anchor 82 will fall back to its normal position on the pond liner 90. This action serves to absorb the slack created in the anchor line 86 as the water circulation apparatus 10 drops down the back side of the passing wave and moves back toward the position of the anchor 80. Thus, the rocking action of the front anchor 82 works in conjunction with the frictional forces contained in the rear anchor 84 to hold a water circulation apparatus 10 in the desired location within any desired lagoon, pond, or other body of water 70.

The manner of construction and the means of operation of the draft hose 24 and its related components are further illustrated in FIGS. 15, 16, 17, and 18. As previously stated, the draft hose 24 is the component of the water circulation apparatus 10 through which water is drawn and channeled into the diffuser 20. The draft hose 24 is connected to the diffuser 20 by means of the draft tube 22 which extends downward from the outside center of the diffuser 22. The draft hose 24 extends down from the bottom terminus of the draft tube 22 to a specific orientation in relation to the bottom of the body of water 70 or the upper surface of the non-permeable pond liner 90.

The draft hose 24 has attached to its lowest most end the strainer 26 which is the component of the draft hose 24 that sits just above the liner 90 and through which the pond water is initially drawn for circulation at the surface. The strainer is made up of the strainer head 94 and the strainer collar 92. The strainer head 94 is a generally a closed off cylinder that is made of a mesh or similar material that will allow for the free flow of water through it but will keep larger items such as weeds from entering the draft hose. This filtering function of the strainer head 94 ensures that the workings of the water circulation apparatus 10 will not be interfered with. Finally, the strainer collar 92 connects the strainer head 94 to the draft hose 24 and also serves as the point of attachment for the hose weight 96. The hose weight 96 serves to keep the lower portion of the draft hose 24, and therefore the strainer head, in the proper location in relation to the bottom of the pond.

The manner of construction of the draft hose 24 and its related components is important to the operation of the water circulation apparatus 10 in that their design ensures that the draft hose 24 will always hang straight down and directly below the diffuser 20. This is accomplished through the use of the hose weight 96 which is a solid section of a relatively large diameter shaft that is mounted in the strainer collar 92. This location of the hose weight 96 serves to hold the lower portion of the draft hose 24 on the bottom of the pond thus, acting much like a draft hose anchor. Additionally, the interior of the strainer head 94 (or that portion of the draft hose that is respectively below the hose weight 96) contains a hollow strainer head float 98. The head float 98 adds a degree of buoyancy to the strainer head 94 which operates to raise the head 94 above the point where the hose weight 96 holds the draft hose 24 to the liner 90. This is an important feature to the operation of the water circulation apparatus 10 as the raised strainer head 94 ensures that water will be taken in from as close to the bottom of the pond as possible without encountering the problems of sucking in unwanted plant or waste material off the bottom.

The manner of construction of the draft hose 24 is also important because of the way it functions with regard to the anchoring system employed with the water circulation apparatus 10. In windy conditions the water circulation apparatus 10 is pushed to the end of the anchor line 86 and generally held there. As the draft hose 24 normally hangs straight down below the diffuser 20 of the water circulation apparatus 10 and is held in that position by the hose weight 96, the draft hose 24 and anchoring line 86 never come into contact and there are therefore no resulting entanglement problems between the anchor line 86 and draft hose 24. However, the rotational forces imparted to the body of the water circulation apparatus 10 by the operation of the impeller 18 may lead to contact between the anchor line 86 and the draft hose 24 which in turn can result in anchor line 86 entanglement. This situation occurs during calm days and is a result of the circulation apparatuses 10 relative position to the anchor 80 and anchor line 86. On a calm day the water circulation apparatus 10 is not held at the end of the anchor line 86 and so the line 86 is slack and the apparatus floats freely. This free floating mode allows the rotating impeller 18 of the water circulation apparatus 10 to impart some of this rotational force to the body of the water circulation apparatus 10. This causes the entire apparatus to spin slightly on the surface of the water which in turn can cause the anchor line 86 to wrap around the draft hose 24. This, however, is not detrimental to the operation of the water circulation apparatus 10 as it does not interfere with the flow of water through the draft hose 24. Additionally, when the wind comes up enough to push the circulation apparatus 10 to the end of the anchor line 86, the wrapped line 86 will freely uncoil and the water circulation apparatus 10 will return to normal operation.

Figure 19:
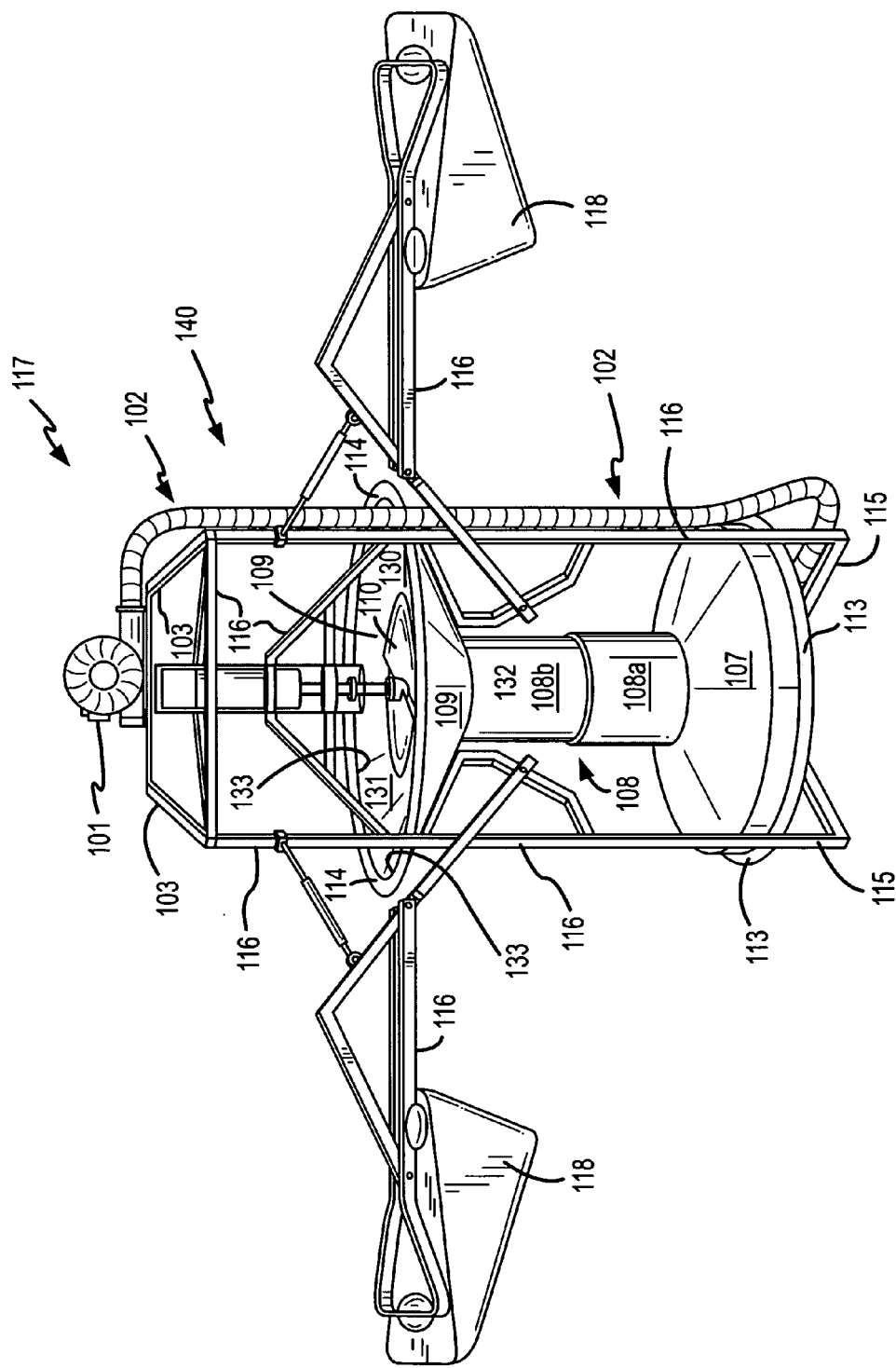
FIG. 19 is a perspective view of another embodiment of a water circulation apparatus, showing the orientation of its major components and the location of the blower, diffusers, and intake structure.
Figure 20:
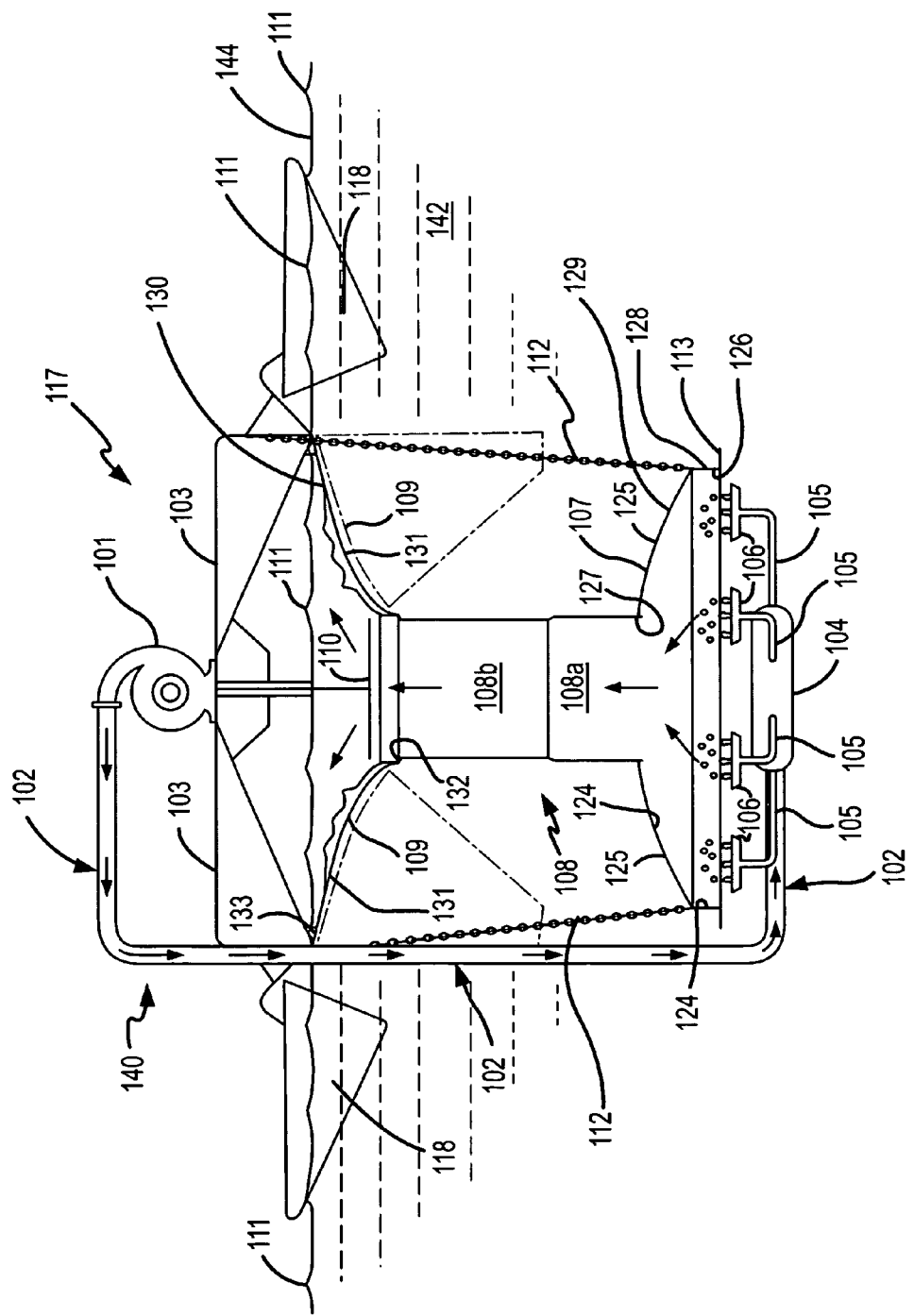
FIG. 20 is a side elevation cut-away view of the configuration presented in FIG. 19.

Another embodiment of a floating water circulation apparatus is illustrated in FIGS. 19–20 and identified by reference numeral 117. Generally, the water circulation apparatus 117 includes an intake housing or dish 107 and a discharge or distribution housing or dish 109 that are interconnected by a vertically oriented draft tube 108. The intake dish 107, distribution dish 109, and draft tube 108 are supported (directly or indirectly) by an appropriately configured framework 116 of the apparatus 117. The framework 116 is in turn supported on a fluid or fluid body 142 by a plurality of floats 118. An impeller 110 is disposed above the upper end of the draft tube 108 within the hollow interior at the distribution dish 109 and is rotatable by an appropriate source (not shown). The impeller 110 has a slightly larger outer diameter than the inner diameter of the draft tube 108. The distribution dish 109 and the impeller 110 may be of the same configuration as the corresponding structure in the above-noted embodiment.

The intake dish 107 is generally a hollow structure having an appropriately shaped lower opening 126 (e.g., circular) on a lower end thereof and a vertically spaced and appropriately shaped upper opening 127 (e.g., circular) on an upper end thereof. An annular wall or lip 113 extends horizontally and radially outwardly from the lower opening 126. In one embodiment, the minimum horizontal extent of the lip 113 is about 1.25 inches, and in another embodiment this minimum horizontal extent is on the order of about 1.5 to about 2 inches.

The intake dish 107 further includes an inner surface 124 that extends from the lower opening 126 to the upper opening 127. Part of this inner surface 124 converges in the direction of the upper opening 127, namely convergent section 125. Although the convergent section 125 is illustrated as having a curvature, other shapes employing the desired convergent nature of the intake dish 107 may be utilized.

The intake dish 107 is defined by a lower annular skirt 128 and an upper section 129 in the illustrated embodiment. The annular skirt 128 is vertically disposed and facilitates incorporation of diffusers 106 in the apparatus 117 in a manner that will be discussed in more detail below. The upper section 129 includes the convergent section 125. A section 108a of the draft tube 108 is attached to the upper end of the intake dish 107 for fluid interconnection with the upper opening 127.

The distribution dish 109 is also generally a hollow structure having an appropriately shaped lower opening 132 (e.g., circular) on a lower end thereof and a vertically spaced and appropriately shaped upper opening 133 on an upper end thereof. An annular wall or lip 114 extends horizontally and radially outwardly from the upper opening 133. In one embodiment, the minimum horizontal extent of this lip 114 is about 1.25 inches, and in another embodiment this minimum horizontal extent is on the order of about 1.5 to about 2 inches.

The distribution dish 109 includes an inner surface 130 that extends from the lower opening 132 to the upper opening 133. At least part of this inner surface 130 diverges in the direction of the upper opening 133, namely divergent section 131. A section 108b of the draft tube 108 is attached to the distribution dish 109 at the lower end of the distribution dish 109 for fluid interconnection with the lower opening 132. The sections 108a (associated with the intake dish 107) and 108b (associated with the distribution dish 109) of the draft tube 108 telescope to provide vertical adjustment capabilities for the intake dish 107 as will be discussed in more detail below.

The water circulation apparatus 117 also includes an oxygen supply system 140. This same oxygen supply system 140 may be utilized by other configurations of water circulation apparatus, including without limitation the water circulation apparatus 10 described above. This oxygen supply system 140 includes: a blower 101, blower mounting framework 103, air line and valve assembly 102, air mixing and distribution manifold 104, a plurality of distribution conduits 105 that serve as mounts for a plurality of devices designed to create bubbles of a given size and consistency, namely diffusers 106 in the illustrated embodiment, and the diffuser mounting framework 115. Although the illustrated embodiment uses ambient air for the oxygen supply system 140, any appropriate source of any oxygen-containing gas may be utilized.

Figure 21:
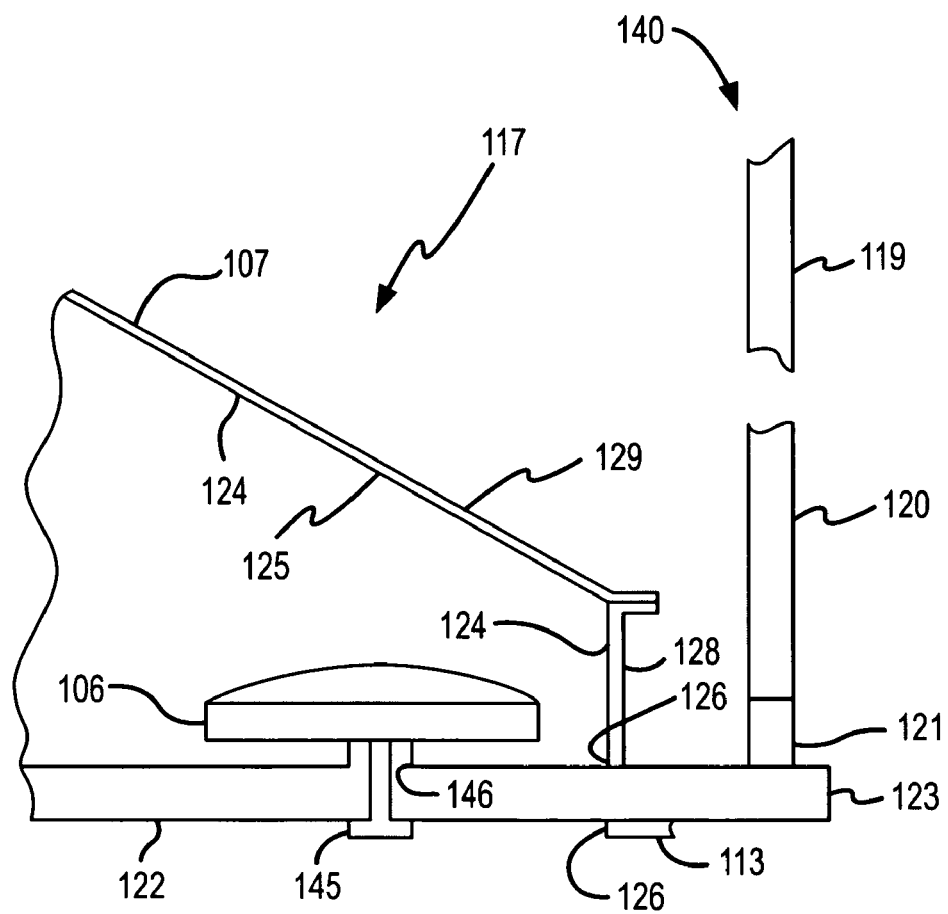
FIG. 21 is a cutaway, side view of an alternative configuration of an injection system for the apparatus of FIG. 19.

Generally, the diffusers 106 are arranged so as to be disposed directly under (vertically) the intake dish 107, and more particularly directly under (vertically) its convergent section 125. Preferably these diffusers 106 are oriented to direct bubbles into the fluid 142 vertically toward its upper surface. In the embodiment of FIGS. 19–20, the diffusers 106 are actually spaced slightly below a reference plane that contains the lower extreme of the intake dish 107. However, these diffusers 106 may be disposed coplanar with this reference plane (not shown) and may even be disposed within the hollow interior of the intake dish (FIG. 21). In any case, all or at least a substantial portion of the bubbles that are injected into the fluid 142 are captured by the intake dish 107 (e.g., entering through the lower opening 127), and the flow of bubbles is converged toward the draft tube 108 by the convergent section 125 of the intake dish 107. That is, at least some of the bubbles that rise vertically within the interior of the intake dish 107 eventually have a horizontal motion component that is induced by the convergent section 125 of the intake dish 107 to converge the bubble flow. Since the intake dish 107 provides functionality in relation to the bubbles provided by the oxygen supply system 140, it may be considered as a component thereof.

Any appropriate source may be used to power one or more of the blower 101 and the impeller 110. Representative sources for both the blower 101 and impeller 110 include: a) solar panels; b) solar-battery combinations, either on the shore, in a floating vessel (including onboard the floating circulation device), or submerged in the pond; c) wind power, either on the shore or affixed to the floating circulation device; d) fuel cells, either on the shore, on the floating circulation device, or submerged; e) internal combustion engine, and f) electricity supplied from one or more shore service panels. The blower 101 is mounted to the framework 116 with a triangular framework 103 that transfers its weight to the framework 116. The blower 101 may be powered by a variety of sources of energy. The blower 101 draws air into its high speed turbine and transfers large volumes at low pressure through an optional control valve and air line 102 to the distribution manifold 104 via one of the air conduits 105.

A plurality of air conduits 105, attached to and ported into the manifold 104, carry the air to a plurality of diffusers 106.

The diffusers 106 may be of several different designs but are alike in that each produces bubbles under relatively low pressure with great efficiency as defined by the volume of air in cubic feet per second, per horse power, transferred into the water at a specific pressure.

When the air exits the array of diffusers 106, it does so in the form of air bubbles whose initial diameters depend a great deal upon the design of the diffuser 106, the diffuser material, the surface tension of the water, and the water pressure at the point of exit. The consistent size of the bubbles is important, since size is a significant factor in the rate of absorption of the oxygen in the bubble into the surrounding water versus the supply. For any given volume of air supply, the smaller that volume is initially divided into spheres, the greater the surface area required to contain it. Oxygen transfer is dependent upon surface area interface. Therefore, for a given supply of air, initially, smaller bubbles are better than larger bubbles.

As the bubbles exit the array of diffusers 106, they immediately begin their ascent to the surface 144. However, the bubbles formed at a point below the conical shape of the intake dish 107, namely its convergent section 125, must first converge toward its center, which in the illustrated embodiment has the upper opening 127. By virtue of its momentum, water drawn by the bubbles toward the center of the intake dish 107 creates a region of higher pressure that accelerates the velocity of the rising column of water in the draft tube 108. The water pressure in the draft tube 108 is consequently less than what would be found at the same depth in quiescent water. Some of the kinetic energy produced by the rising bubbles is transferred to the movement of water within the draft tube 108. The volume and velocity of the column of water in the draft tube 108 constitutes the DMD transfer capability of this "air pump". In the case of the apparatus 117, the impeller 110 does not appreciably contribute to, nor detract from, the DMD. Instead, the primary function of the impeller 110 is to generate waves. That is, the movement of the bubbles defines a substantial portion of the fluid discharged from the apparatus 117.

As the column of water passes through the zone occupied by the impeller 110 or an impeller zone, that is independently powered from a variety of sources, a pulse effect is imparted to the column of water, creating spiral waves 111 (one wave front per impeller blade per revolution) that exit the distribution dish 109. The outer perimeter of this distribution dish 109 has a horizontal lip 114 similar to that utilized by the intake dish 107. In one embodiment, the length of the lip 114 on the distribution dish 109 and the length of the lip 113 on the intake dish 107 are both at least about 1.25 inches in one embodiment, and are both at least about 1.5 inches in another embodiment. The horizontal lip 114 introduces fluid from the apparatus 117 into the fluid body 142 at least substantially parallel with its upper surface 144. Preferably the flow is also at least substantially laminar as it exits the apparatus 117 over the lip 114. In one embodiment, this lip 114 is disposed about 1.5 inches below the upper surface 144 of the fluid body 142. In another embodiment, the lip 114 is disposed about 1 inch below the surface 144 of the fluid body 142. In yet another embodiment, the lip 114 is disposed about 0.75 inches below the surface 144 of the fluid body 142. Depths of about 0.5 inches to about 1.5 inches are reasonable ranges.

The water exiting the distribution dish 109 will have absorbed a predictable amount of oxygen from the column of bubbles. The depth of the oxygen-rich water exiting the distribution dish 109 is determined by the depth at which the dish 109 is set below the surface 144 of the water or fluid body 142. Unlike the System, wherein over 30 seconds of time must pass (a distance of about 30 feet from its distribution dish) for oxygen to saturate only a very thin film (16000 Angstroms or about 0.000063 inch) of water, the oxygen-enriched zone is up to an inch deep as it exits the distribution dish 109 of the apparatus 117.

The oxygen absorbed into the surface water will be carried in laminar sheets radially outward from the distribution dish 109. This oxygen-rich layer begins immediately to supply the forces of diffusion. The layer of saturated water will also retain a significant number of undissolved bubbles that will remain on or near the surface as the water flows radially away from the distribution dish 109. Some of the oxygen contained in these bubbles will continue to be absorbed into the surrounding water. The remainder will escape back into the atmosphere as these bubbles break the surface tension. As these successive sheets flow toward the embankment, the dissolved oxygen continues to diffuse downward toward regions of lower dissolved oxygen concentrations. It does so until it reaches concentrations of equal value.

Herein lies the significant difference between the apparatus 117 and the System disclosed in International Publication No. WO 00/71475 A1. Because the water discharged over the distribution dish 109 from the work of the apparatus 117 is nearly saturated to significantly greater depths (1 inch compared to 0.00006 inch) and realizes flows in higher volumes than that of the System, the diffusion of oxygen begins immediately and occurs at a greater rate in the case of the apparatus 117. The diffusion phase of the System does not occur until the water has traveled a greater distance from its distribution dish. This, coupled with its dependence on surface area for reaeration, limits the System to larger ponds and those in which the oxygen demand is not more than can be supplied through reaeration and photosynthetic plants.

As the higher concentration of oxygen from the apparatus 117 is diffused to oxygen depleted regions below, the surface water is again open for reaeration from the atmosphere. Pure oxygen from the atmosphere will once again reaerate the surface layer.

The laminar sheets continue moving on the surface until they reach the embankment of the fluid body 142. At that point a shallow head is built, causing the oxygen-rich water to descend, following the profile of the embankment.

When the descending water reaches the depth of the intake dish lip 113, it begins to slowly migrate on converging streamlines with increasing speed and whose relative directions become increasingly less parallel as the water approaches the intake dish lip 113. The depth of this horizontally converging zone extends from the depth of the lip 113, to not more than six inches below it. Because of the type of induced currents described in the International Publication No. WO/0071475 A1, all of the water volume between the surface 144 and six inches below the intake lip 113 will eventually become mixed. It is believed that a draft zone for the apparatus is no more than about a 6 inch vertical layer of fluid 142 that is horizontally disposed, except directly under the apparatus 117 where the draft zone bulges downwardly to a degree.

As the volume and rate of mixing are important factors in the treatment of wastewater and clarification of freshwater ponds, the control of these factors are advantageous. The depth of the intake lip 113 or its distance from the surface 144 of the fluid body 142, and therefore the volume of the mixed portion of a pond, can be controlled from the surface by the operator through an intake adjuster(s) 112 (e.g., extenders, chains, or cables) that are attached to the intake dish 107 for raising and lowering the same. Any appropriate structure may be utilized by the intake adjuster 112. The range of control of the intake lip 113 depth varies with the model selected for a given application. The telescopic draft tube 108, with different lengths, can accommodate lip setting depths (for the lip 113) from 30 to 70 inches. In situations where greater mixing depths are required, the telescopic draft tube 108 may be replaced with a longitudinally-compressible hose of the same diameter (e.g., a bellows-like configuration).

Upon reaching the lip 113 of the intake dish 107, the water is once again drawn into the "air pump". By this time its oxygen content has been diminished, either through losses from diffusion or to biological and chemical reactions along the route. As such it is once again receptive to the absorption of oxygen from the bubbles formed by the diffusers, and the cycle is thus continuously repeated as long as the blower 101 and impeller 110 are working.

An alternative way to introduce gas to the various diffusers 106 is illustrated in FIG. 21. Here a gas supply line 119 (e.g., of any appropriate configuration/material, but in one embodiment a fixed wall structure) extends from the blower assembly 101 and down the side of the floating water circulation apparatus 117 to an appropriate location where it fluidly interconnects with a flexible conduit 120. This flexible conduit 120 in turn extends down to an elevation at least generally corresponding with the lip 113 on the intake dish 107. Here the flexible conduit 120 is mounted on an adapter 121 of a manifold conduit 122 that extends to the mixing and distribution manifold 104 (FIG. 20). The end 123 of the manifold conduit 122 is capped to direct the flow of gas therein to the mixing and distribution manifold 104, and in one embodiment is a 2 inch by 2 inch square tube. The manifold conduit 122 extends through an opening in the skirt 128 of the intake dish 107 just above the horizontal lip 113.

Unlike the configuration presented in FIG. 20, one of the diffusers 106 is appropriately mounted on the manifold conduit 122. The diffuser 106 is mounted on the manifold conduit 122 by a stud 145 that is fixed to the conduit 122 and that extends through a larger opening 146 in the upper wall of the conduit 122. The diffuser 106 is then mounted on this stud 146. All other diffusers 106 are similarly mounted on conduits that are structurally similar to the manifold conduit 122, but which extend from the mixing and distribution manifold 104. Therefore, gas from the blower 101 is directed into the manifold conduit 122 and to the diffuser 106 mounted thereon before reaching the mixing and distribution manifold 104, for subsequent distribution to all other diffusers 106. Notwithstanding this configuration, the flow rate out of each of the diffusers 106 is at least generally the same.

Any appropriate structures may be used for injecting oxygen-containing bubbles into the fluid in the above-noted manner. In the illustrated embodiment, diffusers 106 are used and which are available from Sanitaire Corporation. In any case, preferably each diffuser 106 is disposed directly under the intake dish 107, and more preferably directly under its convergent section 125. Bubbles exiting the diffusers 106 should be allowed to travel vertically a certain distance before engaging the convergent section 125 of the inner surface 124 of the intake dish 107. In one embodiment, the minimum distance between each diffuser 106, (the uppermost portion thereof), and a vertically aligned portion of the convergent section 125 is about ½ of the diameter of the diffuser 106.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. An aerator, comprising:
    an intake housing comprising a first opening, a second opening vertically spaced from said first opening, and an annular intake housing inner surface that extends between said first and second openings and that comprise a convergent section that converges in a direction of said second opening;
    a discharge housing vertically spaced from said intake housing and comprising a third opening, a fourth opening vertically spaced from said third opening, and an annular discharge housing inner surface that extends between said third and fourth openings, wherein said discharge housing inner surface comprises a divergent section that diverges in a direction of said fourth opening;
    a conduit interconnecting said second opening of said intake housing and said third opening of said discharge housing, wherein said first opening of said intake housing is disposed at a greater depth in a fluid body than said fourth opening of said discharge housing when said aerator is disposed within the fluid body;
    at least one gas injector disposed vertically under and spaced from said convergent section of said intake housing inner surface; and
    a wave generator.

2. An aerator, as claimed in claim 1, wherein:
    said intake housing comprises an at least generally horizontally disposed, annular first wall that extends radially beyond said first opening.

3. An aerator, as claimed in claim 2, wherein:
    said first wall has a minimum horizontal extent of about 1.25 inches.

4. An aerator, as claimed in claim 2, further comprising:
    means for adjusting a vertical position of said first wall.

5. An aerator, as claimed in claim 1, wherein:
    said intake housing inner surface comprises annular first and second sections, wherein said first section is vertically disposed and defines said first opening, wherein said second section extends from said first section in a converging manner toward said second opening, and wherein said second section is said convergent section.

6. An aerator, as claimed in claim 1, wherein:
    said conduit comprises a first conduit section interconnected with said intake housing and a second conduit section interconnected with said discharge housing, wherein said first and second conduit sections are telescopingly engaged.

7. An aerator, as claimed in claim 1, wherein:
    said conduit comprises means for changing a length of said conduit.

8. An aerator, as claimed in claim 1, wherein:
said discharge housing comprises an at least generally horizontally disposed, annular second wall that extends radially beyond said fourth opening.

9. An aerator, as claimed in claim 8, wherein:
said second wall has a minimum horizontal extent of about 1.25 inches.

10. An aerator, as claimed in claim 1, wherein:
said intake housing comprises an at least generally horizontally disposed, annular first wall that extends radially beyond said first opening; and
said discharge housing comprises an at least generally horizontally disposed, annular second wall that extends radially beyond said fourth opening.

11. An aerator, as claimed in claim 10, wherein:
both said first and second walls have a minimum horizontal extent of about 1.25 inches.

12. An aerator, as claimed in claim 1, wherein:
each said gas injector is disposed within a hollow interior of said intake housing.

13. An aerator, as claimed in claim 1, wherein:
said at least one gas injector comprises a plurality of said gas injectors, wherein each said gas injector is disposed vertically under and spaced from said convergent section of said intake housing inner surface.

14. An aerator, as claimed in claim 1, further comprising:
an air source fluidly interconnected with each said gas injector.

15. An aerator, as claimed in claim 1, wherein:
said at least one gas injector comprises a plurality of said gas injectors.

16. An aerator, comprising:
a frame;
a first float, wherein said frame is supported in a fluid body when said aerator is disposed within the fluid body;
an intake housing supported by said frame and comprising first and second vertically spaced ends, a first opening at said first end, an at least generally horizontally disposed first wall at said first end that extends radially beyond said first opening, a second opening at said second end, and an intake housing inner surface that extends between said first and second openings, wherein said intake housing inner surface comprises a convergent section that converges in a direction of said second opening;
a discharge housing supported by said frame, vertically spaced from said intake housing, and comprising third and fourth vertically spaced ends, a third opening at said third end, a fourth opening at said fourth end, an at least generally horizontally disposed second wall at said fourth end that extends radially beyond said fourth opening, and a discharge housing inner surface that extends between said third and fourth openings, wherein said discharge housing inner surface comprises divergent section that diverges in a direction of said fourth opening, and wherein said second wall is disposed in proximity to but still below an upper surface of the fluid body when said aerator in disposed in the fluid body;
a conduit interconnecting said second opening of said intake housing and said third opening of said discharge housing, wherein said first opening of said intake housing is disposed at a greater depth in the fluid body than said fourth opening of said discharge housing when said aerator is disposed within the fluid body, and wherein a vertical spacing between said first and second walls is adjustable to change a depth that said first wall is disposed within the fluid body when said aerator is installed on the fluid body; and
a wave generator.

17. An aerator, as claimed in claim 16, wherein:
said first wall is annular.

18. An aerator, as claimed in claim 17, wherein:
said first wall has a minimum horizontal extent of about 1.25 inches.

19. An aerator, as claimed in claim 16, wherein:
said intake housing inner surface comprises annular first and second sections, wherein said first section is vertically disposed and defines said first opening, wherein said second section extends from said first section in a converging manner toward said second opening, and wherein said second section is said convergent section.

20. An aerator, as claimed in claim 16, wherein:
said conduit comprises a first conduit section interconnected with said intake housing and a second conduit section interconnected with said discharge housing, wherein said first and second conduit sections are telescopingly engaged.

21. An aerator, as claimed in claim 16, wherein:
said conduit comprises means for changing a length of said conduit.

22. An aerator, as claimed in claim 16, wherein:
said second wall is annular.

23. An aerator, as claimed in claim 22, wherein:
said second wall has a minimum horizontal extent of about 1.25 inches.

24. An aerator, as claimed in claim 23, wherein:
said first wall is annular and has a minimum horizontal extent of about 1.25 inches.

25. An aerator, as claimed in claim 16, further comprising:
at least one gas injector disposed vertically under and spaced from said convergent section of said intake housing inner surface.

26. An aerator, as claimed in claim 25, wherein:
each said gas injector is disposed within a hollow interior of said intake housing.

27. An aerator, as claimed in claim 25, wherein:
each said gas injector is disposed vertically below and spaced from said convergent section of said intake housing inner surface.

28. An aerator, as claimed in claim 25, further comprising:
an air source fluidly interconnected with each said gas injector.

29. An aerator, as claimed in claim 25, wherein:
said at least one gas injector comprises a plurality of said gas injectors.

30. An aerator, comprising:
a frame;
a first float, wherein said frame is supported in a fluid body when said aerator is disposed within the fluid body;
an intake housing supported by said frame and comprising a first opening, a second opening vertically spaced from said first opening, and an annular intake housing inner surface that extends between said first and second openings, wherein said intake housing inner surface comprises a convergent section that converges in a direction of said second opening;
a discharge housing vertically spaced from said intake housing and comprising a third opening, a fourth opening vertically spaced from said third opening, and an annular discharge housing inner surface that extends between said third and fourth openings, wherein said discharge housing inner surface comprises a divergent section that diverges in a direction of said fourth opening;

a conduit interconnecting said second opening of said intake housing and said third opening of said discharge housing, wherein said first opening of said intake housing is disposed at a greater depth in the fluid body than said fourth opening of said discharge housing when said aerator is disposed within the fluid body;

a plurality of gas injectors that are each disposed vertically under and spaced from said convergent section of said intake housing inner surface; and an impeller mounted within a hollow interior of said discharge housing directly above and spaced from said conduit, and wherein said impeller has a larger outer diameter than an inner diameter of said conduit.

31. An aerator, as claimed in claim 30, wherein:
said intake housing comprises an at least generally horizontally disposed, annular first wall that extends radially beyond said first opening.

32. An aerator, as claimed in claim 31, wherein:
said first wall has a minimum horizontal extent of about 1.25 inches.

33. An aerator, as claimed in claim 31, further comprising:
means for adjusting a vertical position of said first wall.

34. An aerator, as claimed in claim 30, wherein:
said intake housing inner surface comprises annular first and second sections, wherein said first section is vertically disposed and defines said first opening, wherein said second section extends from said first section in a converging manner toward said second opening, and wherein said second section is said convergent section.

35. An aerator, as claimed in claim 30, wherein:
said conduit comprises a first conduit section interconnected with said intake housing and a second conduit section interconnected with said discharge housing, wherein said first and second conduit sections are telescopingly engaged.

36. An aerator, as claimed in claim 30, wherein:
said conduit comprises means for changing a length of said conduit.

37. An aerator, as claimed in claim 1, wherein:
said discharge housing comprises an at least generally horizontally disposed, annular second wall that extends radially beyond said fourth opening.

38. An aerator, as claimed in claim 37, wherein:
said second wall has a minimum horizontal extent of about 1.25 inches.

39. An aerator, as claimed in claim 30, wherein:
said intake housing comprises an at least generally horizontally disposed, annular first wall that extends radially beyond said first opening; and
said discharge housing comprises an at least generally horizontally disposed, annular second wall that extends radially beyond said fourth opening.

40. An aerator, as claimed in claim 39, wherein:
both said first and second walls have a minimum horizontal extent of about 1.25 inches.

* * * * *